(12) United States Patent
Luthra et al.

(10) Patent No.: US 11,558,251 B1
(45) Date of Patent: Jan. 17, 2023

(54) METHOD, APPARATUS, AND COMPUTER READABLE MEDIUM

(71) Applicant: Rakuten Mobile, Inc., Tokyo (JP)

(72) Inventors: Mohit Luthra, Singapore (SG); Bharath Rathinam, Tokyo (JP); Abhishek Sharma, Tokyo (JP); Shinya Kita, Tokyo (JP); Jithin Chathankandath, Tokyo (JP); Mihir Pathak, Tokyo (JP); Amey Wadekar, Tokyo (JP); Rajasi Ahuja, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/645,956

(22) Filed: Dec. 23, 2021

(51) Int. Cl.
   *H04L 41/0823* (2022.01)
   *G06F 8/65* (2018.01)
   *H04L 67/60* (2022.01)

(52) U.S. Cl.
   CPC ............ *H04L 41/0823* (2013.01); *G06F 8/65* (2013.01); *H04L 67/60* (2022.05)

(58) Field of Classification Search
   CPC ........ H04L 41/0823; H04L 67/60; G06F 8/65
   USPC .................................................. 709/217, 220
   See application file for complete search history.

(56) References Cited

U.S. PATENT DOCUMENTS

| | | | |
|---|---|---|---|
| 10,922,284 B1 * | 2/2021 | Venkatasubramanian | H04L 61/4523 |
| 2003/0233431 A1 | 12/2003 | Reddy et al. | |
| 2008/0263543 A1 * | 10/2008 | Ramachandran | G06F 8/61 717/177 |
| 2017/0046374 A1 | 2/2017 | Fletcher et al. | |
| 2017/0099280 A1 * | 4/2017 | Goel | H04L 67/146 |
| 2018/0081983 A1 | 3/2018 | Carru et al. | |
| 2018/0198692 A1 | 7/2018 | Ansari et al. | |
| 2018/0321918 A1 * | 11/2018 | McClory | H04L 63/0281 |
| 2021/0303368 A1 * | 9/2021 | Yu | G06F 9/5077 |

OTHER PUBLICATIONS

Slawik, Mathias, Christophe Blanchet, Yuri Demchenko, Fatih Turkmen, Alexy Ilyushkin, Cees De Laat, and Charles Loomis. "Cyclone: The multi-cloud middleware stack for application deployment and management." In 2017. (Year: 2017).*

* cited by examiner

*Primary Examiner* — Oscar A Louie
*Assistant Examiner* — Melaku Y Habtemariam
(74) *Attorney, Agent, or Firm* — Hauptman Ham, LLP

(57) ABSTRACT

A method includes creating a package of an application, registering the package with an orchestrator, triggering instantiation of the application in the orchestrator, generating initial configuration files for the instantiation of the application, changing an application state of the application to a planned state, changing the application state to a Keycloak state in response to obtaining client identification of the Keycloak information for the application, changing the application state to an instantiated state in response to deploying the application on the set of target servers, changing the application state to a configured state in response applying daily configuration files to perform daily configuration of the application in the set of target servers, and changing the application state to a monitored state in response to monitoring the application in the set of target servers by an observability framework tool.

20 Claims, 10 Drawing Sheets

| | Column 1 | Column 2 | Column 3 | Column 4 |
|---|---|---|---|---|
| | Application Number | Application State | Application Name/Type | Target Server Names |
| Row 1 | 1 | DRAFT | K8s upgrade | JOE1 |
| Row 2 | 2 | PLANNED | K8s uninstall | JOE2 – JOE 1000 |
| | 3 | KEYCLOAK | Os K8s ha install | BOB1 |
| | 4 | INSTANTIATED | Os K8s nonha install | BOB2 |
| | 5 | CONFIGURED | K8s password change | BOB3 |
| | 6 | MONITORED | Os install | BOB4 |
| | 7 | FAILED | OS upgrade | BOB5 |
| | 8 | CONFIGURED | Fpga upgrade | BOB6 |
| Row 10 | 9 | MONITORED | Firmware upgrade | BOB7 |

METHOD, APPARATUS, AND COMPUTER READABLE MEDIUM

BACKGROUND

Network service providers and device manufacturers (e.g., wireless, cellular, etc.) are continually challenged to deliver value and convenience to consumers by, for example, providing compelling network services that are capable of being flexibly constructed, scalable and diverse.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 6 is a diagram of an application state interface, in accordance with some embodiments.

DETAILED DESCRIPTION

Figure 1:
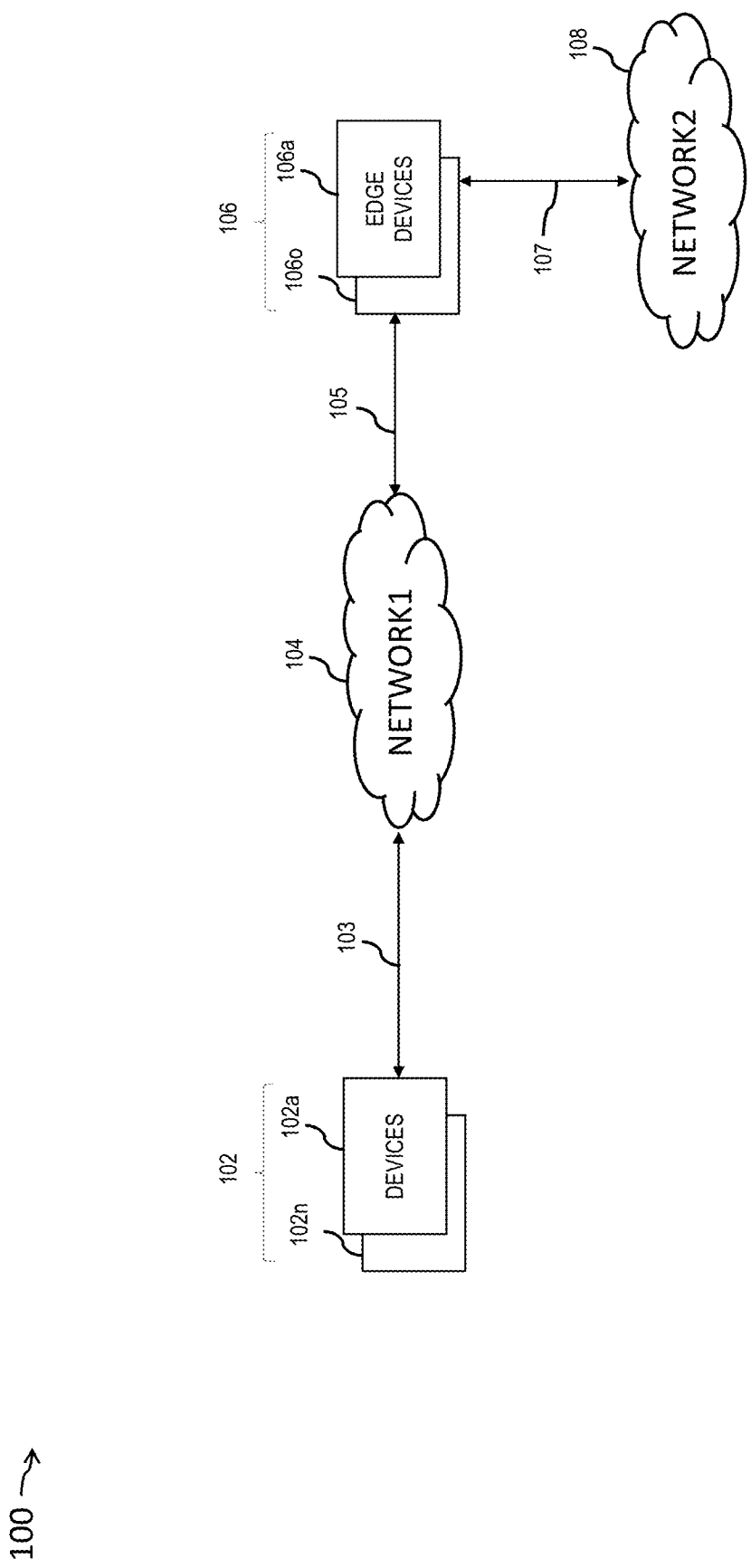
FIG. 1 is a block diagram of a communication system, in accordance with some embodiments.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Network services are often provided by static or inflexible systems that are difficult to configure, scale, and deploy over various target areas. Network service providers are challenged to provide network systems and/or network services that are capable of being flexibly constructed, scalable and diverse.

Some network systems deploy applications in various steps, and few steps are automated, and the other steps are manual. For example, when an application is placed into production, for each step, a different tool is used which makes the application deployment process very time consuming. Furthermore, the application owner passes the required configuration files to each tool manually, and the application owner also tracks each step of the process manually.

FIG. 1 is a block diagram of a communication system 100 (hereinafter referred to as "system 100"), in accordance with some embodiments.

System 100 includes a set of devices 102 coupled to a network 104 by a link 103, and the network 104 is further coupled to a set of edge devices 106 by a link 105. System 100 further includes a network 108 coupled to the set of edge devices 106 by a link 107. The set of edge devices 106 and the set of devices 102 are coupled to each other by network 104.

The set of devices 102 includes at least device 102a, 102b, . . . , 102m or 102n, where n is an integer corresponding to a number of devices in the set of devices 102. In some embodiments, one or more devices in the set of devices 102 corresponds to a computing device, a computing system or a server. In some embodiments, a device 201 (FIG. 2) corresponds to one or more devices 102a, 102b, . . . , 102n of the set of devices 102. In some embodiments, system 1000 (FIG. 10) is an embodiment of one or more devices 102a, 102b, . . . , 102n of the set of devices 102. In some embodiments, the set of devices 102 corresponds to a server farm. In some embodiments, the set of devices 102 corresponds to a data center.

In some embodiments, one or more of the devices of the set of devices 102 is a type of mobile terminal, fixed terminal, or portable terminal including a desktop computer, laptop computer, notebook computer, netbook computer, tablet computer, wearable circuitry, mobile handset, server, gaming console, or combination thereof. In some embodiments, one or more of the devices of the set of devices 102 comprises a display by which a user interface is displayed.

Other configurations, different types of devices or other number of sets in the set of devices 102 are within the scope of the present disclosure.

The set of edge devices 106 includes at least edge device 106a, 106b, . . . , 106n or 106o, where o is an integer corresponding to a number of edge devices in the set of edge devices 106. In some embodiments, integer o is greater than integer n. In some embodiments, integer o is greater than integer n by at least a factor of 100. In some embodiments, the integer o is greater than integer n by at least a factor of 1000. Other factors are within the scope of the present disclosure.

Figure 2:
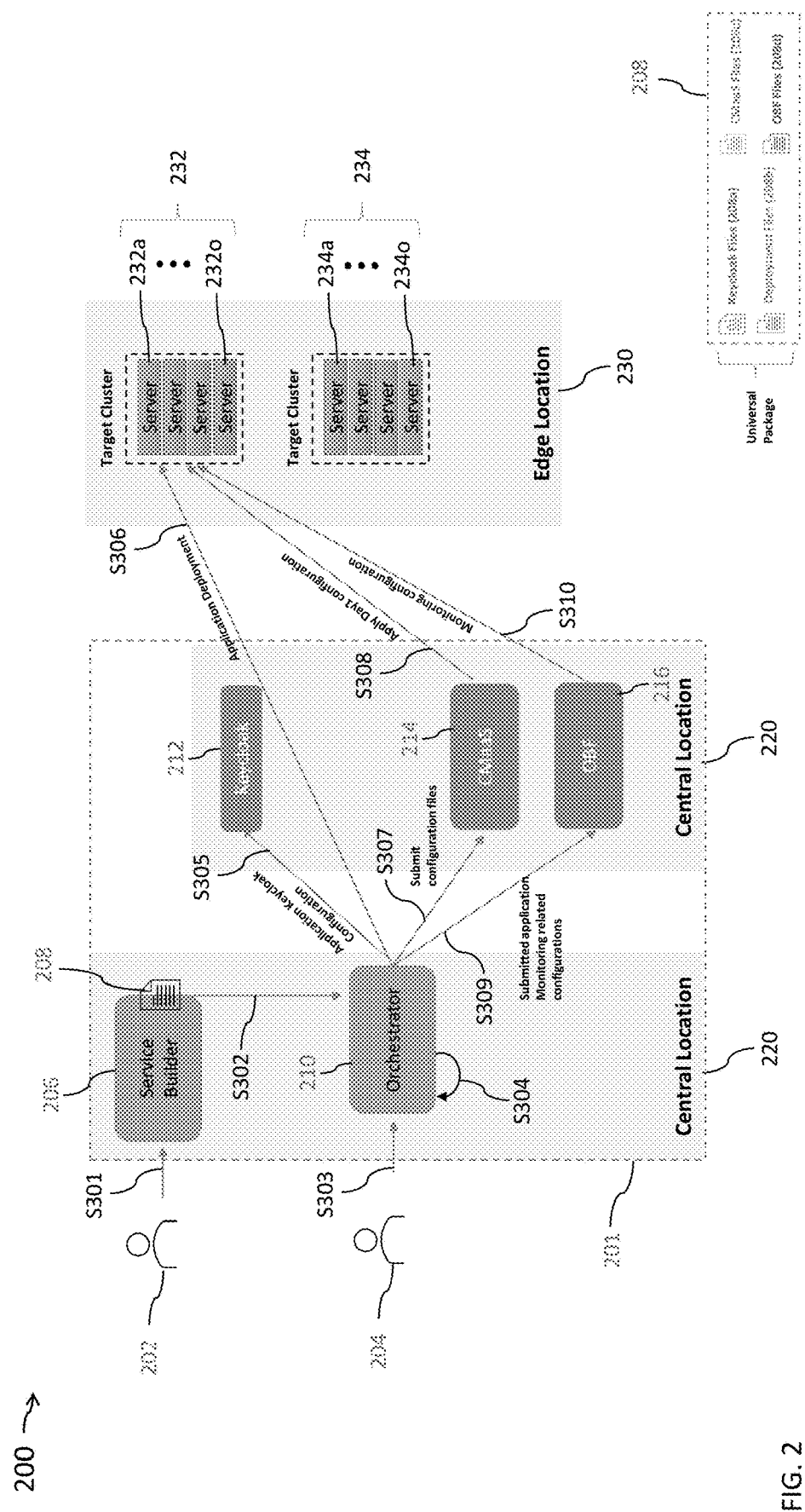
FIG. 2 is a block diagram of a system, in accordance with some embodiments.

In some embodiments, one or more edge devices in the set of edge devices 106 corresponds to a computing device, computing system or a server. In some embodiments, the set of edge devices 106 corresponds to at least a set of target servers 232 (FIG. 2) or a set of target servers 234 (FIG. 2). In some embodiments, system 1000 (FIG. 10) is an embodiment of one or more edge devices 106a, 106b, . . . , 106n or 106o of the set of edge devices 106. In some embodiments, the set of edge devices 106 corresponds to a server farm. In some embodiments, the set of edge devices 106 corresponds to a data center.

Other configurations, different types of edge devices or other number of sets in the set of edge devices 106 are within the scope of the present disclosure.

In some embodiments, at least network 104 or 108 corresponds to a wired or wireless network. In some embodiments, at least network 104 or 108 corresponds to a local area network (LAN). In some embodiments, at least network 104 or 108 corresponds to a wide area network (WAN). In some embodiments, at least network 104 or 108 corresponds to a metropolitan area network (MAN). In some embodiments, at least network 104 or 108 corresponds to an internet area network (IAN), a campus area network (CAN) or a virtual private networks (VPN). In some embodiments, at least network 104 or 108 corresponds to the Internet.

Other configurations, number of networks or different types of network in at least network 104 or 108 are within the scope of the present disclosure.

In some embodiments, at least link 103, 105 or 107 is a wired link. In some embodiments, at least link 103, 105 or 107 is a wireless link. In some embodiments, at least link 103, 105 or 107 corresponds to any transmission medium type; e.g. fiber optic cabling, any wired cabling, and any wireless link type(s). In some embodiments, at least link 103, 105 or 107 corresponds to shielded, twisted-pair cabling, copper cabling, fiber optic cabling, and/or encrypted data links.

In some embodiments, at least link 103, 105 or 107 is based on different technologies, such as code division multiple access (CDMA), wideband CDMA (WCDMA), time division multiple access (TDMA), frequency division multiple access (FDMA), Orthogonal Frequency Division Multiplexing (OFDM), time division duplexing (TDD), frequency division duplexing (FDD), Bluetooth, Infrared (IR), or the like, or other protocols that may be used in a wireless communications network or a wired data communications network. Accordingly, the exemplary illustrations provided herein are not intended to limit the embodiments of the disclosure and are merely to aid in the description of aspects of the embodiments of the disclosure.

Other configurations or number of links in at least in link 103, 105 or 107 are within the scope of the present disclosure. For example, while FIG. 1 shows a single link for each of link 103, 105 or 107, one or more of links 103, 105 or 107 include a plurality of links.

Other configurations or number of elements in system 100 are within the scope of the present disclosure.

FIG. 2 is a block diagram of a system 200, in accordance with some embodiments.

System 200 is an embodiment of system 100, and similar detailed description is omitted.

System 200 includes a device 201 connected to a set of target servers 232 and a set of target servers 234. Device 201 is located at a location 220. At least the set of target servers 232 or the set of target servers 234 is located at an edge location 230. The location 220 is different from the edge location 230. In some embodiments, the location 220 is at a same location as the edge location 230. In some embodiments, location 220 is referred to as a central location.

Figure 3:
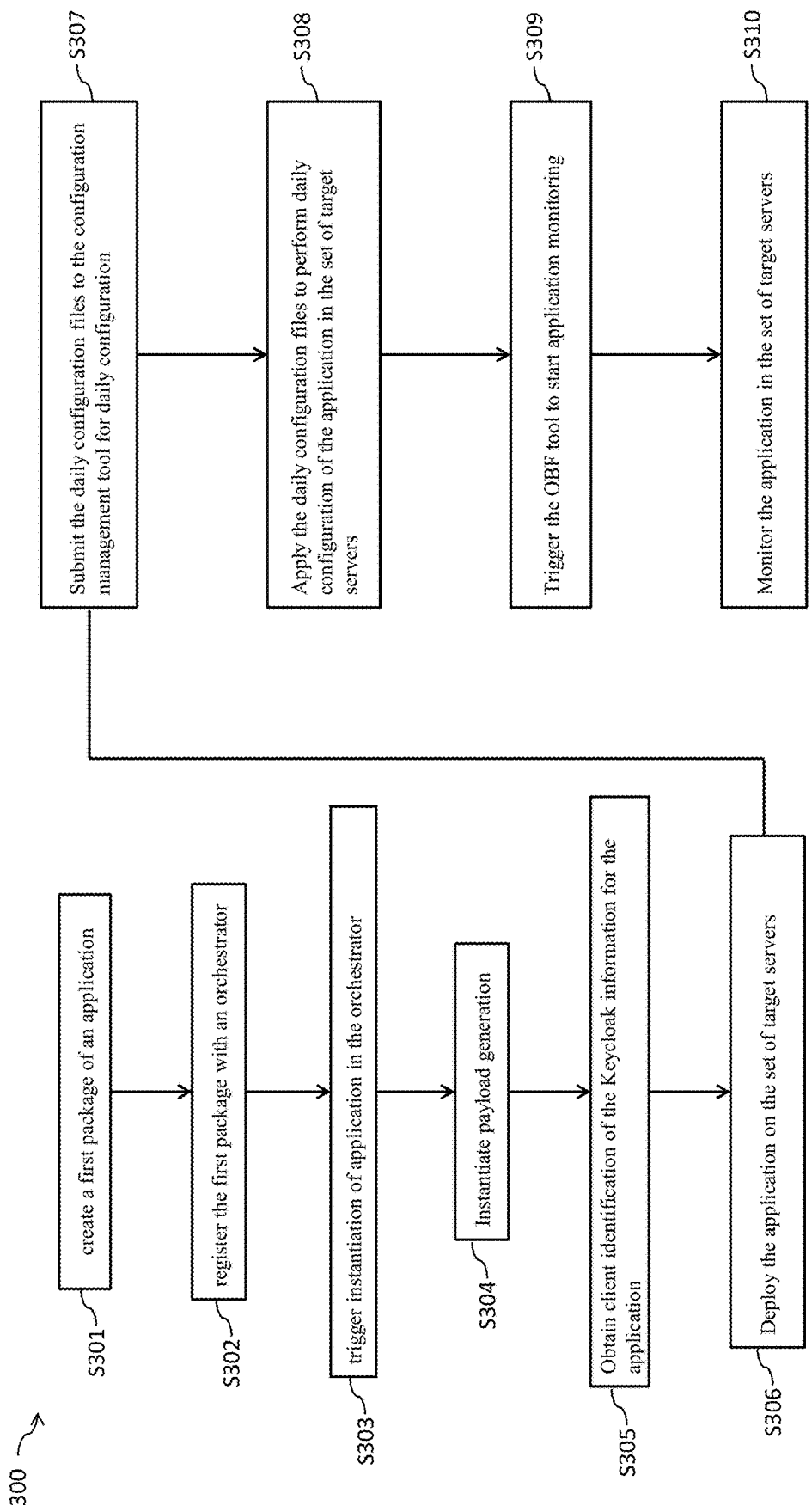
FIG. 3 is a flowchart of a method, in accordance with some embodiments.

System 200 shows a series of steps or operations (e.g., S301, S302, S303, S305, S306, S307, S308, S309 and S310), performed by system 200, and are described in FIG. 3 as method 300.

Device 201 is an embodiment of one or more devices in the set of devices 102 of FIG. 1, and similar detailed description is omitted. At least the set of target servers 232 or the set of target servers 234 is an embodiment of one or more edge devices in the set of edge devices 106 of FIG. 1, and similar detailed description is omitted. Device 201 is coupled to at least the set of target servers 232 or the set of target servers 234 by a network (not shown), such as network 104.

The set of target servers 232 includes at least target server 232a, 232b, . . . , 232s or 232t, where t is an integer corresponding to a number of servers in the set of target servers 232.

The set of target servers 234 includes at least target server 234a, 234b, . . . , 234t or 234u, where u is an integer corresponding to a number of servers in the set of target servers 234. In some embodiments, integer u is that same as integer t. In some embodiments, integer u is different from integer t.

The target servers in the set servers 232 or 234 are a logical grouping of target servers. For example, in some embodiments, the set of target servers 232 or 234 are servers located within one server device. For example, in some embodiments, the set of target servers 232 or 234 are servers located within more than one server device. While FIG. 2 shows two sets of target servers, other numbers of sets of target server 232 and 234 and other numbers of target servers within the set of target servers 232 234 are within the scope of the present disclosure.

Device 201 is configured to automatically provision and to automatically deploy one or more software applications on at least the set of target servers 232 or 234. In some embodiments, device 201 is configured to provide automatic end-to-end orchestration, deployment, configuration and management of the one or more software applications on at least the set of target servers 232 or 234. The set of target servers 232 and 234 are configured to store, execute and provide access to the one or more deployed applications by network 104 and 108 to other devices (including the set of devices 102).

Device 201 includes a service builder 206 that is configured to generate a package 208 in response to input from a user 202. The service builder 206 is configured to package the one or more software applications with the required set of configuration files and management files. In some embodiments, the service builder 206 includes a user interface where the user 202 is able to select and upload the corresponding files of the package to the device 201. In some embodiments, the service builder 206 is software stored in device 201.

The package 208 includes a series of software files useable by device 201 to automatically provision and to automatically deploy one or more software applications on at least the set of target servers 232 or 234. In some embodiments, package 208 is referred to as a "universal package." In some embodiments, the package 208 has a standardized format useable by the orchestrator 210 to automatically provision, orchestrate, manage and to deploy one or more software applications on at least the set of target servers 232 or 234 in an efficient manner. For example, the use of the standardized format of package 208 ensures that version mismatch between different files in the package 208 is avoided. In some embodiments, the package 208 has a known directory structure, and orchestrator 210 is able to extract the relevant files from package 208, and each of the files in the package 208 are able to be utilized in an efficient manner.

Package 208 includes at least Keycloak files 208a, deployment files 208b, configuration management as a service (CMaaS) files 208c or observability framework (OBF) files 208d.

Keycloak files 208a include security files useable by Keycloak 212. In some embodiments, Keycloak files 208a include identity access management (IAM) files. In some embodiments, the Keycloak files 208a are useable by device 201 to secure the one or more applications deployed on at least the set of target servers 232 or 234. In some embodiments, the Keycloak files 208a include at least kcclientregistration.yaml or keycloak.yaml. Other file types are within the scope of the present disclosure for Keycloak files 208a.

Deployment files 208b include one or more files for deployment of the one or more software applications on at least the set of target servers 232 or 234. In some embodiments, deployment files 208b include Helm chart data or files. In some embodiments, the Helm chart data is part of a bundle file. In some embodiments, the bundle file is, for example, a file obtained by compressing a file group having a predetermined directory structure (e.g., a file in tar.gz format). Other file types are within the scope of the present disclosure for deployment files 208b.

CMaaS files 208c include one or more configuration management files for CMaaS 214. In some embodiments, CMaaS files 208c include daily configuration files (discussed below in FIG. 8) used by the CMaaS 214 to configure the one or more deployed software applications. Other file types are within the scope of the present disclosure for CMaaS files 208c.

OBF files 208d include one or more observation files for OBF 216. In some embodiments, OBF files 208d include monitoring configuration files (discussed below in FIG. 9) used by the OBF 216 to observe and monitor the one or more deployed software applications. Other file types are within the scope of the present disclosure for OBF files 208d.

Orchestrator 210 is configured to receive input from a user 204 and the package 208 from service builder 206. In some embodiments, the input received from user 204 corresponds to user 204 triggering deployment of the application on at least the set of target servers 232 or 234. In some embodiments, triggering deployment of the application on at least the set of target servers 232 or 234 includes user 204 clicking a button on a screen of the orchestrator 210. In some embodiments, the button is associated with the application, and corresponds to an on-boarding button. In some embodiments, user 204 is the same as user 202. In some embodiments, user 204 is different from user 202.

Orchestrator 210 is configured to extract relevant files from the package 208, and to pass one or more of the files in the package 208 to the other parties in the ecosystem (e.g., Keycloak 212, CMaaS 214, OBF 216, set of target servers 232 and 234). In some embodiments, orchestrator 210 is configured to untarr the bundle or package 208 and identifies each of the files present inside it. In some embodiments, orchestrator 210 is configured to read the directory structure of each file in the package 208 to find out the corresponding file type.

Orchestrator 210 is configured to automatically provision and to automatically deploy one or more software applications on at least the set of target servers 232 or 234. Orchestrator 210 is also referred to as an end-to-end orchestrator (E2EO). In some embodiments, orchestrator 210 is configured to provide automatic end-to-end orchestration, configuration and management of the one or more software applications on at least the set of target servers 232 or 234. In some embodiments, the automatic end-to-end orchestration, deployment, configuration and management of each software application is characterized as a corresponding workflow. Orchestrator 210 is configured to provide automatic end-to-end orchestration, deployment, configuration and management of each software application as a corresponding workflow, and provides user 204 with each corresponding state of the automatic end-to-end orchestration, deployment, configuration and management for each software application or workflow. Orchestrator 210 also is configured to display the end-to-end orchestration, deployment, configuration and management of each software application as a corresponding workflow by a user interface (e.g., application state interface 600).

In some embodiments, orchestrator 210 is configured to receive the package 208 and the triggering input from the user 204.

In response to being triggered by user 204, orchestrator 210 is configured to automatically deploy the one or more applications on at least the set of target servers 232 or 234, and distribute files from the package 208 to the other corresponding portions (e.g., Keycloak 212, CMaaS 214, OBF 216), and triggering and ensuring proper configuration of the other corresponding portions (e.g., Keycloak 212, CMaaS 214, OBF 216) in the ecosystem. For example, in some embodiments, orchestrator 210 is configured to obtain a Keycloak client identification (Client_Id), deploying the application on at least the set of target servers 232 or 234, sending configuration files to CMaaS 214 for Day-0, Day-1, Day-2 configuration or the like, and triggering OBF 216 to start application monitoring.

Orchestrator 210 is configured to monitor and maintain one or more application states to track the overall status of the one or more applications during automated deployment and automated provisioning.

Figure 5:
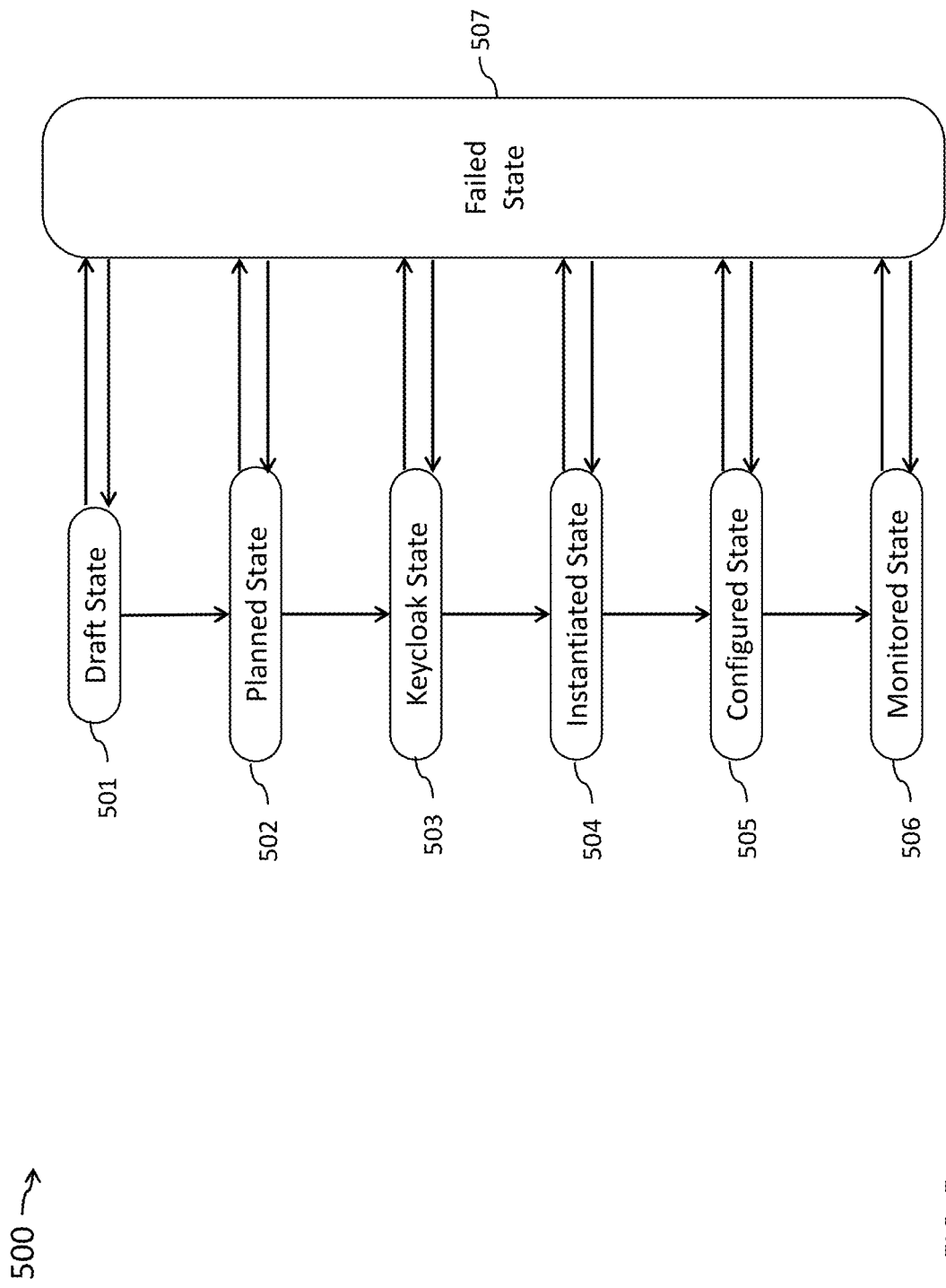
FIG. 5 is a state transition diagram of a method, in accordance with some embodiments.
Figure 7:
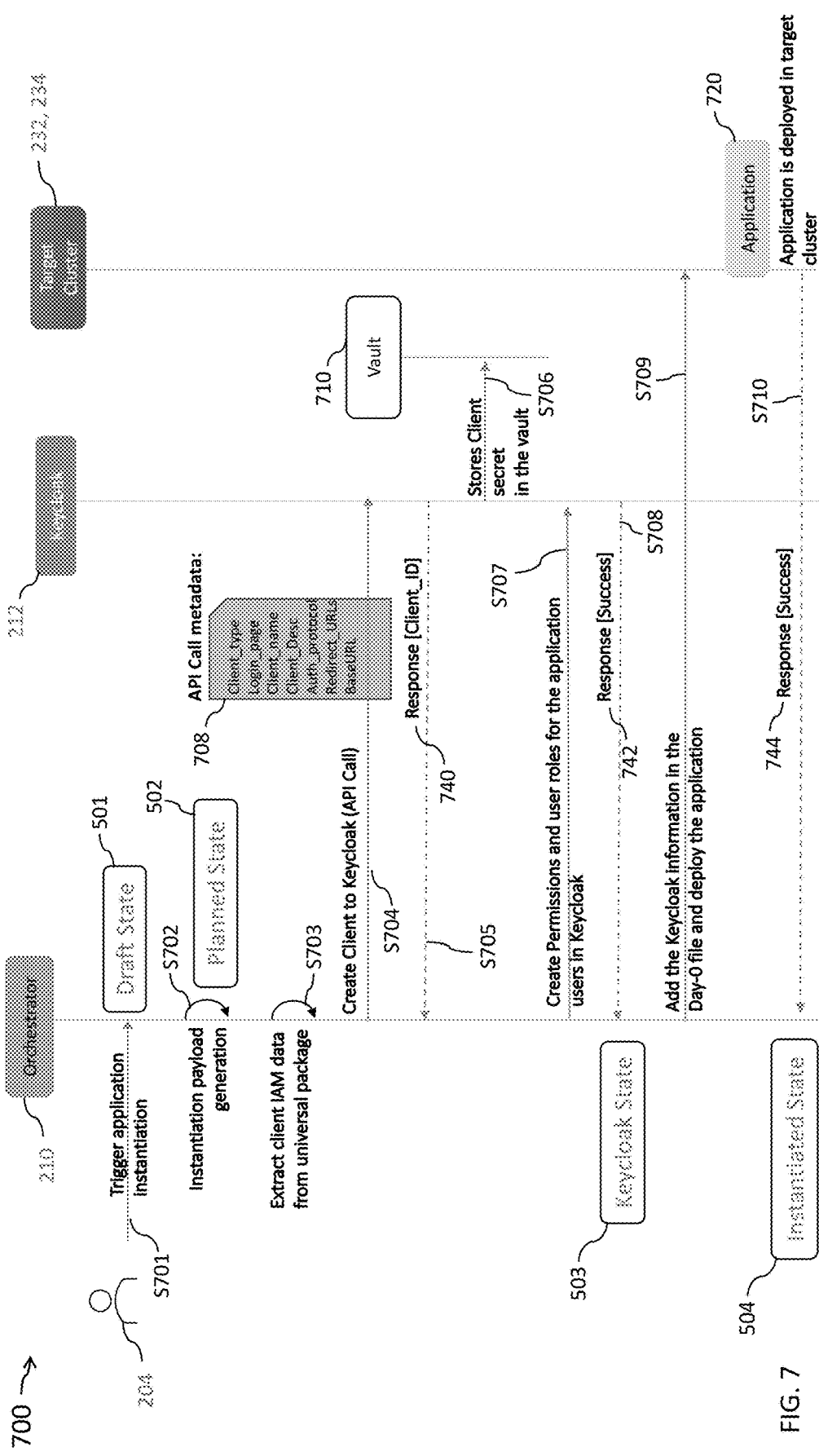
FIG. 7 is a flowchart of a method, in accordance with some embodiments.
Figure 8:
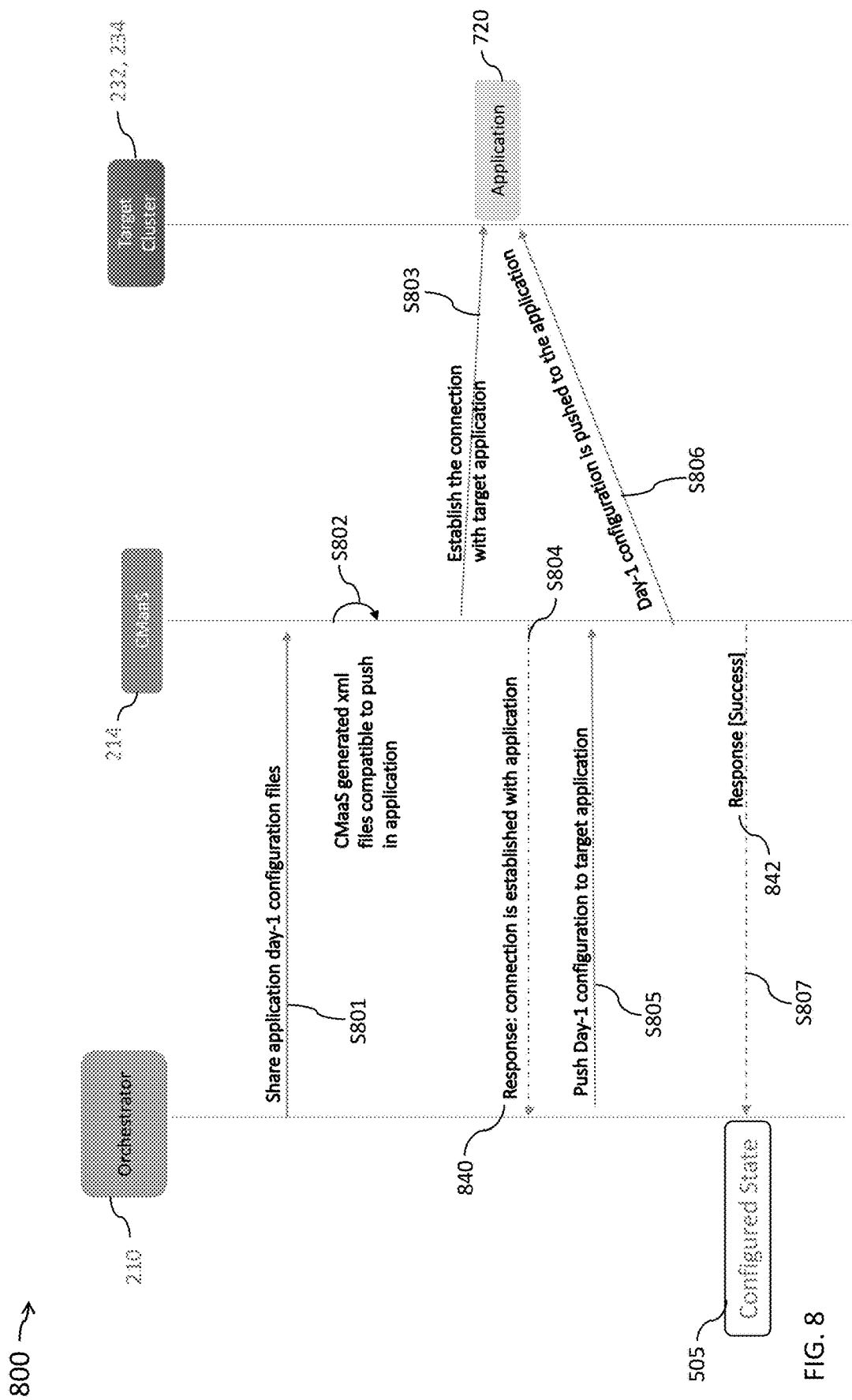
FIG. 8 is a flowchart of a method, in accordance with some embodiments.
Figure 9:
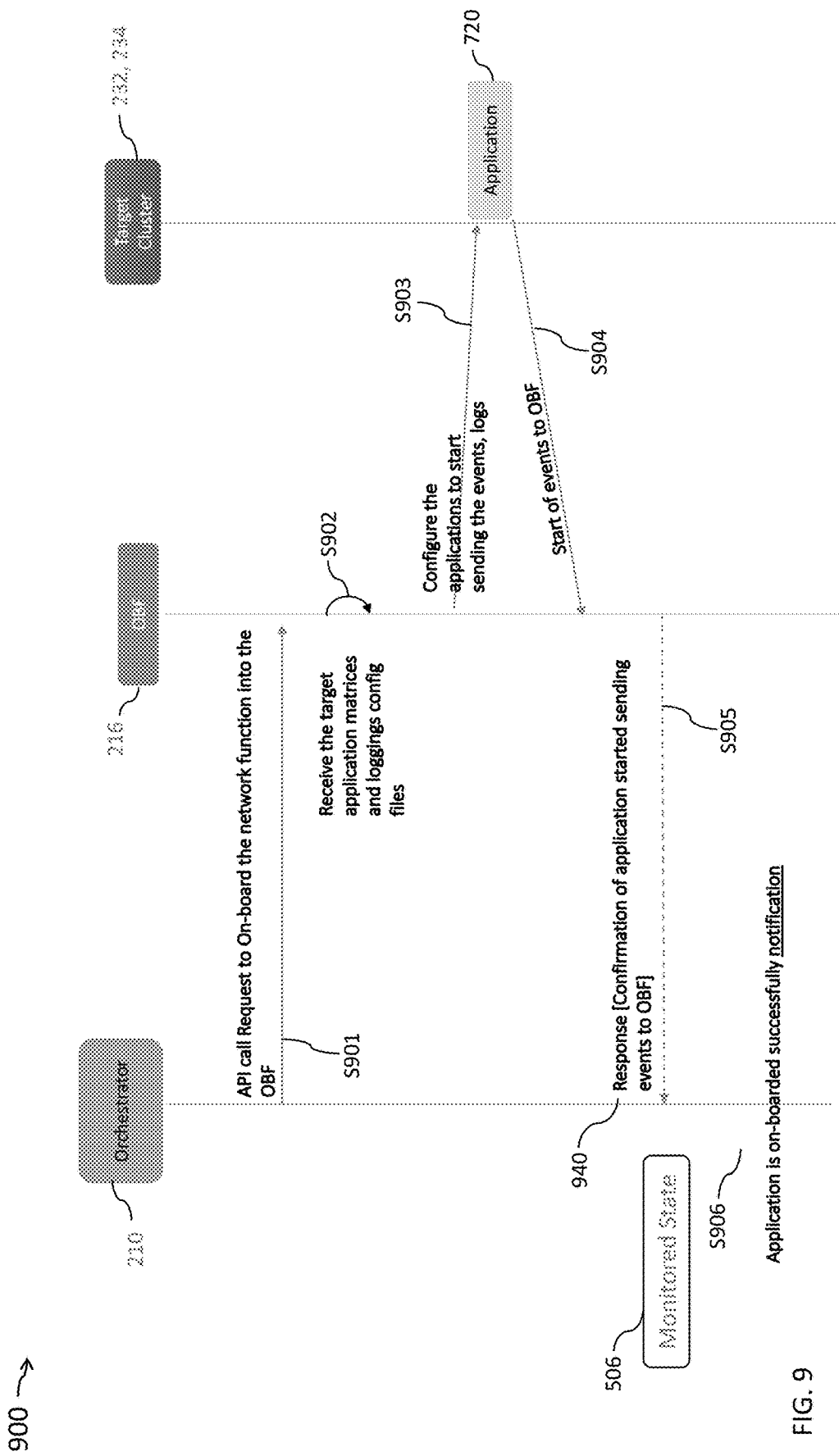
FIG. 9 is a flowchart of a method, in accordance with some embodiments.

In some embodiments, during operation of at least method 300 of FIG. 3, method 700 of FIG. 7, method 800 of FIG. 8, or method 900 of FIG. 9, the orchestrator 210 is updated with the status of one or more operations of method 300, 700, 800 or 900, thereby allowing orchestrator 210 to change one or more application states as shown by a state transition diagram 500 in FIG. 5.

In some embodiments, by using orchestrator 210, the orchestrator 210 is automatically configured to monitor and maintain one or more application states to track the overall status of the one or more applications during automated deployment and automated provisioning from a central location (e.g., the orchestrator 210) in response to being triggered by user 204 rather than other approaches where a user has to separately perform each individual step or operation for each different portion of the application deployment and management process, and the tracking of states of the application deployment process are not tracked by other approaches.

In some embodiments, the example set of states for orchestrator 210 include a draft state 501, a planned state 502, a Keycloak state 503, a deployed or instantiated state 504, a configured state 505, a monitored state 506, and a failed state 507 (shown in FIG. 5).

In some embodiments, the draft state 501 includes instantiation or deployment of an application on the set of target servers 232 or 234 being triggered. In some embodiments, user 204 triggers the instantiation or deployment of the application on the set of target servers 232 or 234. In some embodiments, the planned state 502 includes the orchestrator 210 generating initial configuration files for the instantiation or deployment of the application on the set of target servers 232 or 234. In some embodiments, the Keycloak state 503 includes client identification generation and required permissions as per application in Keycloak 212. In some embodiments, the deployed or instantiated state 504 includes the application being successfully deployed or instantiated on at least the set of target servers 232 or 234. In some embodiments, the configured state 505 includes one or more configuration files, such as the Day-1 configuration files, that have been successfully applied in at least the set of target servers 232 or 234. In some embodiments, the monitored state 506 includes that OBF 216 has started monitoring the deployed application. In some embodiments, the failed state 507 includes failure of any of the above steps or steps in method 300. Other states for orchestrator 210 are within the scope of the present disclosure.

In some embodiments, by using orchestrator 210, the end-to-end deployment of one or more applications on the set of target servers 232 and 234 is automated resulting in an end-to-end on-boarding application process that is reduced in time compared to other approaches where the application deployment is not automated.

In some embodiments, by using orchestrator 210, the end-to-end deployment of one or more applications on the set of target servers 232 and 234 is automated and able to be tested prior to application deployment resulting in less errors than other approaches where the application deployment is not automated.

In some embodiments, by using orchestrator 210, the orchestrator 210 is automatically configured to deploy and manage configuration files from a central location (e.g., the orchestrator 210) in response to being triggered by user 204 rather than other approaches where a user has to separately perform each individual step or operation for each different portion of the application deployment and management process.

Keycloak 212 is configured to send/receive Keycloak data to/from orchestrator 210. Keycloak 212 is configured to secure the one or more on-boarded applications. In some embodiments, browser applications are configured to redirect a user's browser from the application to the Keycloak authentication server where the user enters their credentials. Thus, users are isolated from the applications deployed on the set of target servers 232 or 234, and the applications do not see a user's credentials. In some embodiments, for Keycloak 212, the one or more applications are given an identity token or assertion that is cryptographically signed. In some embodiments, the tokens include identity information like username, address, email, and other profile data. In some embodiments, the tokens further include permission data so that the one or more applications are able to make authorization decisions. In some embodiments, Keycloak 212 is a separate server managed on network 104.

CMaaS 214 is configured to receive daily configuration files from the orchestrator 210. CMaaS 214 is configured to perform daily configuration of the one or more applications in the set of target servers 232 or 234 by using the daily configuration files.

OBF 216 is configured to receive the daily monitoring configurations from the orchestrator 210. OBF 216 is configured to monitor the one or more applications in at least the set of target servers 232 or 234. In some embodiments, OBF 216 is configured to provide status updates to the orchestrator 210 based on monitoring the application.

In some embodiments, at least service builder 208, orchestrator 210, Keycloak 212, CMaaS 214 or OBF 216 is a corresponding software module within device 201. In some embodiments, at least service builder 208, orchestrator 210, Keycloak 212, CMaaS 214 or OBF 216 is a corresponding tool within device 201. In some embodiments, one or more of service builder 208, orchestrator 210, Keycloak 212, CMaaS 214 or OBF 216 is a separate device or server located within central location 220, and the one or more separate devices communicate with each other.

Other configurations or number of elements in system 200 are within the scope of the present disclosure.

FIG. 3 is a flowchart of a method 300, in accordance with some embodiments.

In some embodiments, method 300 is a method of providing end-to-end workflow management of an application deployment/on-boarding process. In some embodiments, at least portions of method 300 are performed by orchestrator 210.

In some embodiments, FIG. 3 is a flowchart of a method of operating system 100 of FIG. 1 or system 200 of FIG. 2, and similar detailed description is therefore omitted. It is understood that additional operations may be performed before, during, and/or after the method 300 depicted in FIG. 3, and that some other operations may only be briefly described herein. In some embodiments, other order of operations of method 300 is within the scope of the present disclosure. In some embodiments, one or more operations of method 300 are not performed.

Method 300 includes exemplary operations, but the operations are not necessarily performed in the order shown. Operations may be added, replaced, changed order, and/or eliminated as appropriate, in accordance with the spirit and scope of disclosed embodiments. It is understood that method 300 utilizes features of one or more of system 100, method 200B or application package configuration 300.

In operation S301 of method 300, a package 208 of an application is created. In some embodiments, package 208 is created by service builder 206 in response to input from a user 202.

In some embodiments, the package includes at least deployment files of the application, Keycloak information for the application, daily management configurations of the application for a configuration management tool, or daily monitoring configurations for monitoring the application in an observability framework (OBF) tool 216. In some embodiments, the configuration management tool includes CMaaS 214.

In operation S302 of method 300, the package 208 is registered with the orchestrator 210.

In some embodiments, operation S302 of method 300 includes reviewing the package 208 by an administrator. In some embodiments, the administrator corresponds to a user 204. In some embodiments, the administrator corresponds to a software entity. After reviewing the package, the administrator can either approve the package 208 or deny the package 208. In some embodiments, if the package 208 is approved, method 300 proceeds to operation S303. In some embodiments, if the package 208 is denied, the user 202 is able to correct any noted deficiencies of the package 208, and then operation S302 is repeated. In some embodiments, noted deficiencies of the package 208 include incorrect file types, incorrect file names, incorrect file locations within the directory structure of the package 208, insufficient file types, or the like. Other types of noted deficiencies in the package 208 are within the scope of the present disclosure.

In operation S303 of method 300, a user 204 triggers instantiation or the future deployment of the application on at least a set of target servers 232 or 234.

In some embodiments, operation S303 includes user 204 clicking a button on a screen of the orchestrator 210, thereby triggering application instantiation by the orchestrator 210. In some embodiments, the button is associated with the application, and corresponds to an on-boarding button. In some embodiments, user 204 is the same as user 202. In some embodiments, user 204 is different from user 202.

In some embodiments, after completion of step S303, orchestrator 210 is configured to set the application state to the draft state 501.

In some embodiments, at least operation S304, S305, S306, S307, S308, S309 or S310 occur in response to triggering deployment of the application in operation S303.

In operation S304 of method 300, instantiation payload data is generated by the orchestrator 210. In some embodiments, the instantiation payload data includes the initial daily configuration files (also referred to as "initial configuration files") for the instantiation or deployment of the application.

In some embodiments, the initial daily configuration files of the application are also referred to as "Day-0 files." In some embodiments, the day-0 files include one or more day-0 parameters. In some embodiments, day-0 parameters include host names, IP addresses, cloud-native network function data (CNFD) or the like.

In some embodiments, operation S304 is triggered in response to user 204 triggering deployment of the application on at least the set of target servers 232 or 234 in operation S303.

In some embodiments, operation S304 is internal to the orchestrator 210.

In some embodiments, after completion of step S304, orchestrator 210 is configured to change the application state to the planned state 502.

In operation S305 of method 300, the orchestrator 210 obtains client identification of the Keycloak information for the application from Keycloak 212. In some embodiments, the client identification of the Keycloak information includes identity access management (IAM) data that is extracted by orchestrator 210 from package 208. In some embodiments, the client IAM data includes at least a client type, a login page, a client name, a client description, an authorization protocol, redirect uniform resource locators (URLs) or a base URL. Other types of IAM data are within the scope of the present disclosure.

In some embodiments, after completion of step S305, orchestrator 210 is configured to change the application state to the Keycloak state 503.

In operation S306 of method 300, the orchestrator 210 deploys the application on at least the set of target servers 232 or 234. In some embodiments, the orchestrator 210 deploys the application on at least the set of target servers 232 or 234 in response to the orchestrator 210 successfully obtaining the Keycloak information for the application.

In some embodiments, after completion of step S306, orchestrator 210 is configured to change the application state to the instantiated state 504.

In operation S307 of method 300, the orchestrator 210 submits the daily configuration files to the configuration management tool (e.g., CMaaS 214). In some embodiments, operation S307 includes triggering the CMaaS 214 to perform daily configuration of the application based on the daily configuration files. In other words, the orchestrator 210 submits the daily configuration files to CMaaS 214 so that CMaaS 214 is able to perform daily configuration of the application based on the daily configuration files.

In operation S308 of method 300, the configuration management tool (e.g., CMaaS 214) performs daily configuration of the application in the set of target servers 232 or 234 by using the daily configuration files. In some embodiments, the daily configuration files include initial configuration files and configuration files that are updated daily. In some embodiments, the configuration files are updated based on a set time period. In some embodiments, the set time period includes hours, days, weeks, months, etc.

In some embodiments, after completion of at least step S307 or S308, orchestrator 210 is configured to change the application state to the configured state 505.

In operation S309 of method 300, the orchestrator 210 submits the daily monitoring configurations to the OBF tool 216. In some embodiments, operation S309 includes the orchestrator 210 triggering the OBF tool 216 to start application monitoring in response to at least the orchestrator 210 submitting the daily monitoring configurations to the OBF tool 216.

In operation S310 of method 300, the OBF tool 216 monitors the application in at least the set of target servers 232 or 234. In some embodiments, the OBF tool 216 provides status updates to the orchestrator 210 based on monitoring the application.

In some embodiments, after completion of at least step S309 or S310 orchestrator 210 is configured to change the application state to the monitored state 506.

In some embodiments, if failure of one or more steps of method 300 occur, orchestrator 210 is configured to change the application state to the failed state 507, and further details are described in FIG. 5.

Figure 4:
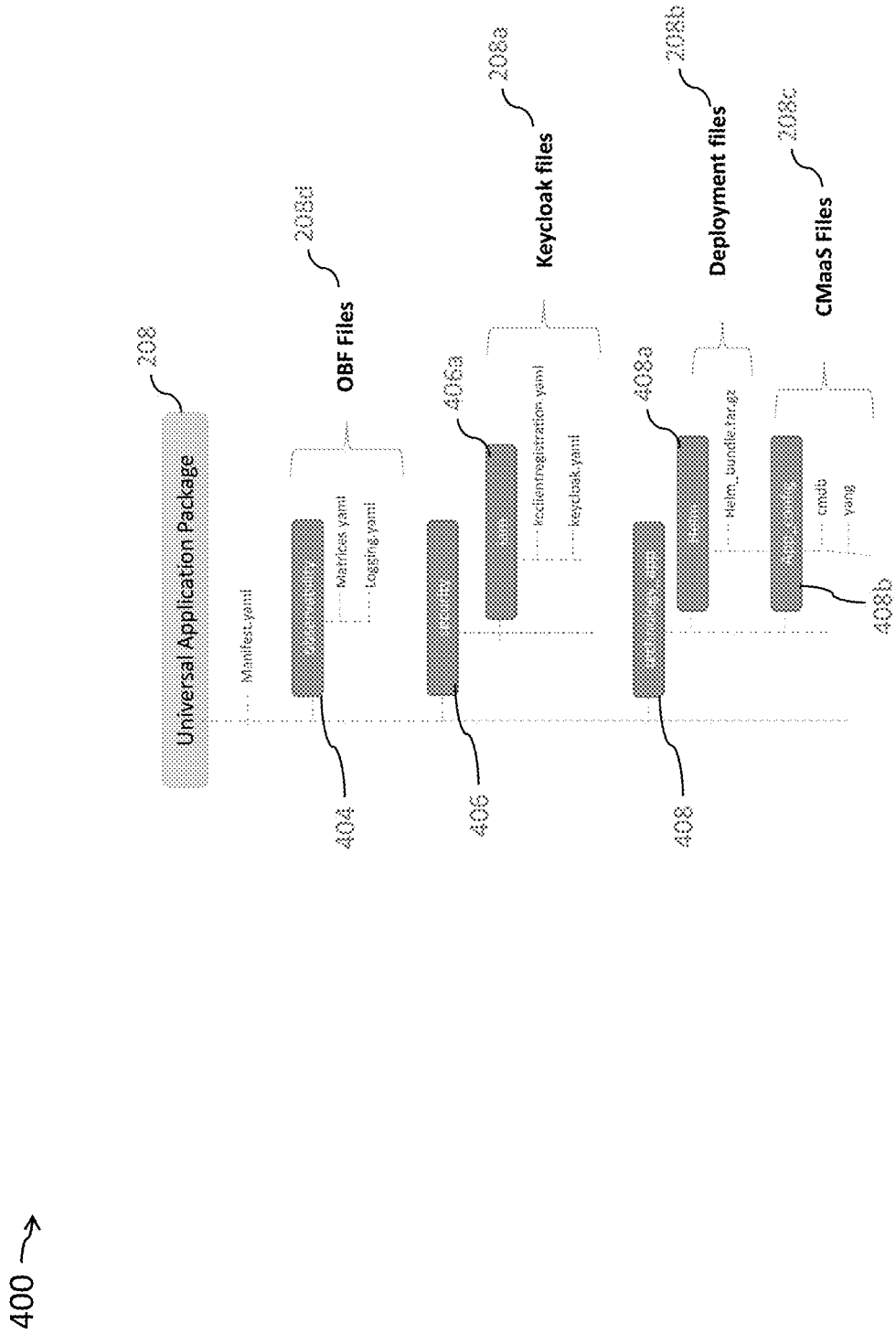
FIG. 4 is a diagram of a universal package, in accordance with some embodiments.

FIG. 4 is a diagram of a universal package 400, in accordance with some embodiments.

Universal package 400 is an embodiment of package 208, and similar detailed description is omitted.

Universal package 400 includes an observability directory 404, a security directory 406, and a technology app directory 408. Each directory in the universal package 400 includes one or more relevant files usable by system 200.

In some embodiments, system 200 knows of the directory structure of the universal package 400, and system 200 is able to extract each of the relevant files from the universal package 400, and each of the files is utilized by system 200 in an efficient manner.

Observability directory 404 includes observation files for OBF 216. For example, the observability directory 404 includes OBF files 208d. In some embodiments, OBF files 208d include Matrices.yaml and Logging.yaml files. Other file types are within the scope of the present disclosure for OBF files 208d.

Security directory 406 includes security files for Keycloak 212. For example, security directory 406 includes an identity access management (IAM) sub-folder 406a that includes IAM files. IAM sub-folder 406a includes Keycloak files 208a. In some embodiments, the Keycloak files 208a include kcclientregistration.yaml and keycloak.yaml. Other file types are within the scope of the present disclosure for security directory 406.

Technology app directory 408 includes a Helm sub-directory 408a and an APP_config sub-directory 408b. The Helm sub-directory 408a includes deployment files (e.g., deployment files 208b) for orchestrator 210 and the set of target servers 232 and 234. The APP_config sub-directory 408b includes configuration management files (e.g., CMaaS files 208c) for CMaaS 214.

The Helm 408a sub-directory includes deployment files 208b. In some embodiments, deployment files 208b include Helm_bundle.tar.gz files. Other file types are within the scope of the present disclosure for deployment files 208b.

The APP_config sub-directory 408b includes CMaaS files 208c. The CMaaS files 208c include Cmdb and yang file types. Other file types are within the scope of the present disclosure for CMaaS files 208c.

Based on the known directory structure of the universal package 400, the orchestrator 210 is able to extract the relevant files from the universal package 400, and each of the files is utilized by orchestrator 210 more efficiently than other approaches.

Other directories, sub-directories and file types for universal package 400 are within the scope of the present disclosure.

FIG. 5 is a state transition diagram 500 of method 300, in accordance with some embodiments.

In some embodiments, the state transition diagram 500 is created and maintained by orchestrator 210, thereby allowing orchestrator 210 to provide end-to-end workflow management of the application deployment/on-boarding process of method 300 of FIG. 3. The state transition diagram 500 displays the different states of the application deployment/on-boarding process of method 300 of FIG. 3. For example, the state transition diagram 500 includes each of the states of the application deployment/on-boarding process of method 300 of FIG. 3. In some embodiments, the state transition diagram 500 is stored in non-transitory memory, such as memory 1004 as application states 1056 in FIG. 10.

The state transition diagram 500 includes a draft state 501, a planned state 502, a Keycloak state 503, an instantiated state 504, a configured state 505, a monitored state 506, and a failed state 507.

Orchestrator 210 is configured to set the application state to the draft state 501. In some embodiments, orchestrator 210 is configured to set the application state to the draft state 501 in response to user 204 triggering instantiation or deployment of the application in step S303. In some embodiments, orchestrator 210 is configured to set the application state to the draft state 501 in response to user 204 selecting a set of target servers for deployment of the application on the set of target servers 232 or 234, and the orchestrator 210 creating an application instance object (e.g., rows 2-9 table 601 in FIG. 6) of the application in an application inventory (e.g., shown as table 601 in FIG. 6) in step S701 (described below).

In some embodiments, orchestrator 210 is configured to change the application state to the failed state 507 in response to the orchestrator 210 failing to successfully select the set of target servers for deployment of the application on the set of target servers, or the orchestrator 210 failing to create the application instance object of the application in the application inventory. For example, in some embodiments, the orchestrator 210 changes the application state to the failed state 507 in response to the user 204 selecting target servers that are offline/non-functional/unavailable or cannot run the application, or the orchestrator 210 fails to successfully create the application instance object of the application in the application inventory. Details of leaving the failed state 507 are described below.

In the draft state 501, orchestrator 210 can change the application state to the failed state 507 or to the planned state 502. In some embodiments, orchestrator 210 is configured to change the application state to the planned state 502 in response to orchestrator 210 generating instantiation payload data in step S304.

In some embodiments, orchestrator 210 is configured to change the application state to the planned state 502 in response to the orchestrator 210 generating the initial configuration files for the instantiation or deployment of the application on the set of target servers 232 or 234 in step S702 (described below). In some embodiments, the initial daily configuration files of the application include Day-0 files.

In some embodiments, orchestrator 210 is configured to change the application state to the failed state 507 in response to the orchestrator 210 failing to successfully generate the initial configuration files for the instantiation or deployment of the application on the set of target servers 232 or 234 in step S702 (described below). For example, in some embodiments, in generating the initial configuration files, the initial configuration files may include incorrect file types/names or incomplete data thus causing the orchestrator 210 to change the application state to the failed state 507.

In the planned state 502, orchestrator 210 can change the application state to the failed state 507 or to the Keycloak state 503. In some embodiments, orchestrator 210 is configured to change the application state to the Keycloak state 503 in response to orchestrator 210 obtaining client identification of the Keycloak information for the application from Keycloak 212 in step S305.

In some embodiments, orchestrator 210 is configured to change the application state to the Keycloak state 503 in response to the orchestrator 210 receiving a response message indicating that permissions and user roles for each corresponding user of the application 720 in Keycloak 212 were successfully created in step S708 (described below), or a response message indicating a client identification (e.g., Client ID), thereby indicating that the client ID was successfully created in step S705 (described below).

In some embodiments, orchestrator 210 is configured to change the application state to the failed state 507 in response to the orchestrator 210 receiving a response message indicating that permissions and user roles for each corresponding user of the application 720 in Keycloak 212 were not successfully created in step S708 (described below), or a response message indicating that the client ID was not successfully created in in step S705 (described below).

In some embodiments, the response message indicating that permissions and user roles for each corresponding user of the application in Keycloak 212 were not successfully created, or the response message indicating that the client ID was not successfully created may be attributed to the API call metadata 708 (FIG. 7) including proper data types or fields, or Keycloak 212 not being able to store Client secrets in the vault 710.

In the Keycloak state 503, orchestrator 210 can change the application state to the failed state 507 or to the instantiated state 504. In some embodiments, orchestrator 210 is configured to change the application state to the instantiated state 504 in response to orchestrator 210 deploying the application on at least the set of target servers 232 or 234 in step S306.

In some embodiments, orchestrator 210 is configured to change the application state to the instantiated state 504 in response to the orchestrator 210 receiving a response message indicating that the application was successfully deployed on the set of target servers 232 or 234 in step S710 (described below).

In some embodiments, orchestrator 210 is configured to change the application state to the failed state 507 in response to the orchestrator 210 receiving a response message indicating that the application 720 was not successfully deployed on the set of target servers 232 or 234 in step S710 (described below). For example, in some embodiments, the response message indicating that the application 720 was not successfully deployed on the set of target servers 232 or 234 may be attributed to the target servers being offline/non-functional/unavailable or cannot properly run the application.

In the instantiated state 504, orchestrator 210 can change the application state to the failed state 507 or to the configured state 505.

In some embodiments, orchestrator 210 is configured to change the application state to the configured state 505 in response to at least the orchestrator 210 submitting the daily configuration files to the configuration management tool (e.g., CMaaS 214) in step S307, or the configuration management tool (e.g., CMaaS 214) performing daily configuration of the application in the set of target servers 232 or 234 by using the daily configuration files in step S308.

In some embodiments, the orchestrator 210 submits the daily configuration files to the configuration management tool (e.g., CMaaS 214) so that the configuration management tool (e.g., CMaaS 214) is able to perform daily configuration of the application based on the daily configuration files. In some embodiments, the orchestrator 210 submitting the daily configuration files to the configuration management tool (e.g., CMaaS 214) is in response to the orchestrator 210 triggering the configuration management tool (e.g., CMaaS 214) to perform daily configuration of the application.

In some embodiments, orchestrator 210 is configured to change the application state to the configured state 505 in response to at least the orchestrator 210 receiving a response message indicating that the daily configuration files were successfully pushed to the application in step S807 (described below). In some embodiments, orchestrator 210 is configured to change the application state to the configured state 505 in response to at least the orchestrator 210 receiving a response message indicating that a connection between CMaaS 214 and the application was successfully established in step S804 (described below).

In some embodiments, orchestrator 210 is configured to change the application state to the failed state 507 in response to at least the orchestrator 210 receiving a response message indicating that the daily configuration files were not successfully pushed to the application in step S807 (described below). In some embodiments, orchestrator 210 is configured to change the application state to the failed state 507 in response to at least the orchestrator 210 receiving a response message indicating that a connection between CMaaS 214 and the application was not successfully established in step S804 (described below).

In some embodiments, the response message indicating that the daily configuration files were not successfully pushed to the application may be attributed to CMaaS 214 not being able to perform daily configuration of the application based on the daily configuration files. In some embodiments, the daily configuration files may include incorrect file types/names or incomplete data thus causing the orchestrator 210 to change the application state to the failed state 507.

In the configured state 505, orchestrator 210 can change the application state to the failed state 507 or to the monitored state 506.

In some embodiments, orchestrator 210 is configured to change the application state to the monitored state 506 in response to at least the orchestrator 210 triggering the OBF tool 216 to start application monitoring in step S309, or the OBF tool 216 monitoring the application in at least the set of target servers 232 or 234 in step S310. In some embodiments, the orchestrator 210 triggering the OBF tool 216 to start application monitoring includes the orchestrator 210 submitting the daily monitoring configurations to the OBF tool 216.

In some embodiments, orchestrator 210 is configured to change the application state to the monitored state 506 in response to the orchestrator 210 receiving a response message confirming that the application has started sending events to the OBF tool 216 in step S905 (described below).

In some embodiments, orchestrator 210 is configured to change the application state to the failed state 507 in response to the orchestrator 210 receiving a response message indicating that the application has not started sending events to the OBF tool 216 in step S905 (described below).

In some embodiments, the response message indicating that the application has not started sending events to the OBF tool 216 may be attributed to target servers being offline/non-functional/unavailable or cannot run the application, or the daily configurations submitted by OBF 216 may include incorrect file types/names or incomplete data.

In the monitored state 506, orchestrator 210 can change the application state to the failed state 507. In some embodiments, state transition diagram 500 further includes a complete state (not shown) that corresponds to the completion of end-to-end workflow management provided by orchestrator 210. In these embodiments, orchestrator 210 can change the application state from the monitored state 506 to the complete state (not shown).

In some embodiments, orchestrator 210 is configured to change the application state to the failed state 507 in response to the orchestrator 210 receiving a response message, from the OBF tool 216, indicating that the application has failed one or more previously configured OBF monitored events.

Other reasons for entering the failed state 507 from each of the states in state transition diagram 500 are within the scope of the present disclosure.

In the failed state 507, the orchestrator 210 is configured to attempt one or more retry options, where user 204 is able to select from the following sub-states 507a, 507b or 507c. In some embodiments, the number of retry option is an integer greater than one.

In sub-state 507a, user 204 can select for method 300 to resume from the failed state 507 of state transition diagram 500. For example, if method 300 failed during the planned state 502, after leaving or transitioning out of the failed state 507, orchestrator 210 can change the application state back to the initial failed state which is planned state 502.

In sub-state 507b, user 204 can select for method 300 to resume from the first state (e.g., draft state 501) of state transition diagram 500. For example, if method 300 failed during the planned state 502, after leaving or transitioning out of the failed state 507, orchestrator 210 can change the application state back to the initial or first state which is draft state 501.

In sub-state 507c, user 204 can select for method 300 to ignore the failed state 507, and to proceed with method 300 from the previous state or advance to the next state of state transition diagram 500. For example, if method 300 failed during the planned state 502, after leaving or transitioning out of the failed state 507, orchestrator 210 can change the application state to the previous state which is the planned state 502, or orchestrator 210 can change the application state to the subsequent state which is Keycloak state 503.

While FIG. 5 shows a single failed state 507, other configurations are within the scope of the present disclosure where failed state 507 includes more than a single failed state. In some embodiments, each application state includes a corresponding state with logic similar to failed state 507, and similar detailed description is omitted.

Other configurations, states, number of states or state transition diagrams for state transition diagram 500 are within the scope of the present disclosure.

FIG. 6 is a diagram of an application state interface 600, in accordance with some embodiments.

In some embodiments, application state interface 600 is viewable by user 202 or 204 by way of a user interface (e.g., user interface 1024 in FIG. 10), and is displayed by orchestrator 210.

The application state interface 600 is a visual representation of the end-to-end workflow management of the application deployment/on-boarding process of method 300 of FIG. 3 for each application.

The application state interface 600 includes table 601. The application state interface 600 displays table 601. Table 601 is an application inventory of each of the applications that have been triggered during application instantiation in step S301 of FIG. 3. With the exception of row 1, each row in table 601 is an application instance object, and is created by orchestrator 210 each time an application is triggered during application instantiation in step S301 of FIG. 3.

Table 601 includes application numbers, the corresponding application state of each application number, the corresponding application names/types of each application number, and the corresponding target server names deploying the corresponding application name/type.

Table 601 comprises 10 rows and 4 columns. Column 1 comprises application numbers. In some embodiments, the application numbers of table 601 are useable to identify the corresponding application. In some embodiments, the application numbers of table 601. Column 2 comprises an application state of each corresponding application number in column 1. Column 3 comprises an application name/type of each corresponding application number in column 1. Column 4 comprises a set of target server names deploying the corresponding application name/type of column 1. Row 1 corresponds to the title fields of table 601.

Each entry in column 1 has a corresponding entry in column 2, a corresponding entry in column 3, and a corresponding entry in column 4. In some embodiments, each entry in column 2 corresponds to the application states (e.g., draft state 501, planned state 502, Keycloak state 503, instantiated state 504, configured state 505, monitored state 506 and failed state 507) shown in FIG. 5. In some embodiments, each entry in column 3 corresponds to one or more application names/types that are deployed on the set of target servers 232 or 234. In some embodiments, the set of target server names of each entry in column 4 includes the set of target servers 232 or 234.

Table 601 is utilized with one or more operations of method 300 of FIG. 3, method 700 of FIG. 7, method 800 of FIG. 8 or method 900 of FIG. 9. In some embodiments, table 601 is utilized with state transition diagram 500 of FIG. 5. In some embodiments, table 601 is stored in memory 1004 of FIG. 10. In some embodiments, table 601 is generated by system 1000 of FIG. 10.

Other numbers of columns, other numbers of rows, or other types of data in table 601 are within the scope of the present disclosure.

In some embodiments, application state interface 600 is a graphical user interface that facilitates customization or creation of the application state machine by way of dragging and dropping one or more objects displayed in the graphical user interface. In some embodiments, user interface is accessible by way of a user terminal (e.g., device 102a). In some embodiments, one or more entries or rows in table 601 are selected by user 202 or 204 to view further details of the application on-boarding process on the set of target servers 232 or 234.

In some embodiments, application state interface 600 makes it possible to create one or more new application deployments or workflows. In some embodiments, application state interface 600 makes it possible to modify one or more existing application deployments or workflows.

In some embodiments, application state interface 600 makes it possible to delete one or more application deployments or workflows. In some embodiments, the selection or creation of one or more workflows for inclusion in the application state interface 600 makes it possible for user 202 or 204 to create a new state in state machine 500.

FIG. 7 is a flowchart of a method 700, in accordance with some embodiments.

Method 700 is an embodiment of at least operations S303, S305 or S306 of method 300 of FIG. 2, and similar detailed description is therefore omitted. For example, in some embodiments, method 700 is a method of at least triggering deployment of the application on a set of target servers, obtaining client identification of the Keycloak information for the application or deploying the application on the set of target servers.

In some embodiments, FIG. 7 is a flowchart of a method of operating system 100 of FIG. 1 or device 201 of FIG. 2, and similar detailed description is therefore omitted. It is understood that additional operations may be performed before, during, and/or after the method 700 depicted in FIG. 7, and that some other operations may only be briefly described herein. In some embodiments, other order of operations of method 700 is within the scope of the present disclosure. In some embodiments, one or more operations of method 700 are not performed.

Method 700 includes exemplary operations, but the operations are not necessarily performed in the order shown. Operations may be added, replaced, changed order, and/or eliminated as appropriate, in accordance with the spirit and scope of disclosed embodiments. It is understood that method 700 utilizes features of one or more of system 100, method 300 or application package configuration 400.

In operation S701 of method 700, instantiation or deployment of application 720 is triggered by user 204. In some embodiments, operation S701 includes user 204 clicking a button on a screen of the orchestrator 210, thereby triggering application instantiation on the orchestrator 210. In some embodiments, the button is associated with the application 720, and corresponds to an on-boarding button. In some embodiments, operation S701 includes user 204 selecting a set of target servers for deployment of application 720 on the set of target servers 232 or 234, and in response to the user input, the orchestrator 210 creating an application instance object (e.g., rows 2-9 table 601 in FIG. 6) of application 720 in an application inventory (e.g., shown as table 601 in FIG. 6) thereby setting the application state of the application 720 as the draft state 501. Stated differently, in response to selecting the set of target servers for deployment of application 720 on the set of target servers 232 or 234, and the orchestrator 210 creating the application instance object (e.g., rows 2-9 table 601 in FIG. 6) of application 720 in the application inventory (e.g., shown as table 601 in FIG. 6), orchestrator 210 sets the application state of the application as the draft state 501.

In some embodiments, operation S701 further includes the orchestrator 210 setting the application state of application 720 to the draft state 501.

In operation S702 of method 700, the orchestrator 210 generates the initial configuration files for the instantiation or deployment of application 720 in operation S306 or operation S709 (described below). In some embodiments, operation S702 is also referred to as the orchestrator 210 generating instantiation payload data (e.g., the initial configuration files) for the instantiation or deployment of application 720 in operation S306 or operation S709 (described below). In some embodiments, operation S702 corresponds to operation S304 of method 300.

In some embodiments, after the orchestrator 210 generates the initial configuration files for the instantiation or deployment of the application, orchestrator 210 changes the application state of the application from the draft state 501 to the planned state 502.

In some embodiments, operation S702 is triggered in response to the application state reaching the draft state 501. In some embodiments, operation S702 further includes the orchestrator 210 changing the application state of application 720 to the planned state 502.

In operation S703 of method 700, client identity access management (IAM) data is extracted by orchestrator 210 from package 208. In some embodiments, the client IAM data includes at least a client type, a login page, a client name, a client description, an authorization protocol, redirect uniform resource locators (URLs) or a base URL. Other types of IAM data are within the scope of the present disclosure.

In some embodiments, at least operation S701 or S703 of method 700 is an embodiment of at least operation S303 of method 300 of FIG. 3, and similar detailed description is therefore omitted.

In operation S704 of method 700, a client is created for Keycloak by an application programming interface (API) call. In some embodiments, the API call includes metadata 508 of the client IAM data. In some embodiments, the API call includes metadata 508 of the client type, the login page, the client name, the client description, the authorization protocol, the redirect URLs or the base URL. Other types of metadata 508 are within the scope of the present disclosure.

In some embodiments, a client includes an entity that can request Keycloak to authenticate the user 204. In some embodiments, a client includes applications and services that use Keycloak to secure themselves and provide a single sign-on solution. In some embodiments, a client includes an entity that requests identity information or an access token in order to securely invoke other services on network 104 that are secured by Keycloak.

In some embodiments, at least operation S703 or S704 is triggered in response to the application state reaching the planned state 502.

In operation S705 of method 700, a response message 740 is received by orchestrator 210. In some embodiments, the response message 740 indicates the client identification (e.g., "Client_ID"), thereby indicating that the client ID was successfully created. In some embodiments, the response message 740 is sent by Keycloak 212. Other message types or numbers of messages for response message 740 are within the scope of the present disclosure.

In operation S706 of method 700, one or more client secrets are stored in a vault 510 of Keycloak 212. Operation S706 is performed by Keycloak 212.

In some embodiments, at least operation S703, S704, S705 or S706 of method 700 is an embodiment of operation S305 of method 300 of FIG. 3, and similar detailed description is therefore omitted.

In operation S707 of method 700, permissions and user roles for each corresponding user of the application 720 are created in Keycloak 212 by the orchestrator 210.

In operation S708 of method 700, a response message 742 is received by the orchestrator 210. In some embodiments, the response message 742 indicates that the permissions and user roles for each corresponding user of the application 720 in Keycloak 212 was successfully created in Keycloak 212, thereby causing the orchestrator 210 to change the application state of application 720 from the planned state 502 to the Keycloak state 503. In some embodiments, the response message 742 is sent by Keycloak 212.

In some embodiments, operation S708 further includes the orchestrator 210 changing the application state of application 720 to the Keycloak state 503.

In some embodiments, one response message 742 is sent by Keycloak 212 for all users having successful permissions and user roles of the application 720 created in Keycloak 212. In some embodiments, the response message 742 is sent by Keycloak 212 for each corresponding user of the application 720 in Keycloak 212 that was successfully created in Keycloak 212. Other message types or numbers of messages for response message 742 are within the scope of the present disclosure.

In operation S709 of method 700, the Keycloak information is added to initial daily configuration files of the application 720, and the application 720 (and the initial daily configuration files of the application 720) are deployed on the set of target servers 232 or 234. In some embodiments, the initial daily configuration files of the application 720 are used to deploy the application 720 on the set of target servers 232 or 234.

In some embodiments, operation S709 is triggered in response to the application state reaching the Keycloak state 503.

In some embodiments, the initial daily configuration files of the application 720 are also referred to as "Day-0 files." In some embodiments, the day-0 files include one or more day-0 parameters. In some embodiments, day-0 parameters include host names, IP addresses, cloud-native network function data (CNFD) or the like.

In some embodiments, the application 720 is deployed on a single target server of the set of target servers 232 or 234. In some embodiments, the application 720 is deployed on more than one target server of the set of target servers 232 or 234.

In operation S710 of method 700, a response message 744 is received by the orchestrator 210. In some embodiments, the response message 744 indicates that the application 720 was successfully deployed on the set of target servers 232 or 234, thereby causing the orchestrator 210 to change the application state of application 720 from the Keycloak state 503 to the instantiated state 504. In some embodiments, the response message 744 is sent by at least the set of target servers 232 or 234. Other message types or numbers of messages for response message 744 are within the scope of the present disclosure.

In some embodiments, operation S710 further includes the orchestrator 210 changing the application state of application 720 to the instantiated state 504.

In some embodiments, at least operation S707, S708, S709 or S710 of method 700 are an embodiment of operation S305 of method 300 of FIG. 3, and similar detailed description is therefore omitted.

In some embodiments, one or more of the operations of method 700 is not performed. By utilizing method 700, one or more elements of system 100 is configured to achieve the benefits discussed above with respect to system 100 and method 300.

FIG. 8 is a flowchart of a method 800, in accordance with some embodiments.

Method 800 is an embodiment of at least operations S307 or S308 of method 300 of FIG. 3, and similar detailed description is therefore omitted. For example, in some embodiments, method 800 is a method of at least the orchestrator 210 submitting the daily configuration files to the configuration management tool, and the configuration management tool performing the daily configuration of the application 720 in the set of target servers 232 or 234.

In some embodiments, FIG. 8 is a flowchart of a method of operating system 100 of FIG. 1 or device 201 of FIG. 2, and similar detailed description is therefore omitted. It is understood that additional operations may be performed before, during, and/or after the method 800 depicted in FIG. 8, and that some other operations may only be briefly described herein. In some embodiments, other order of operations of method 800 is within the scope of the present disclosure. In some embodiments, one or more operations of method 800 are not performed.

Method 800 includes exemplary operations, but the operations are not necessarily performed in the order shown. Operations may be added, replaced, changed order, and/or eliminated as appropriate, in accordance with the spirit and scope of disclosed embodiments. It is understood that method 800 utilizes features of one or more of system 100, method 300 or application package configuration 400.

In some embodiments, operation method 800 is triggered in response to the application state reaching the instantiated state 504.

In operation S801 of method 800, the daily configuration files are shared by orchestrator 210 with a configuration management tool (hereinafter referred to as "CMaaS 214"). In some embodiments, operation S801 includes the orchestrator 210 sending the daily configuration files to CMaaS 214. In some embodiments, operation S801 includes the orchestrator 210 granting authorization to the CMaaS 214 to access the daily configuration files.

In some embodiments, the daily configuration files of the application 720 include configuration files for each corresponding day that the application was deployed. For example, day-1 files are associated with the $1^{st}$ day of deployment of the application 720 on the set of target servers 232 or 234, day-2 files are associated with the $2^{nd}$ day of deployment of the application 720 on the set of target servers 232 or 234, and so forth. In some embodiments, the daily configuration files of the application 720 are updated daily, and method 800 is repeated for each day that the configuration files of the application 720 are updated.

In some embodiments, the daily configuration files of the application 720 include one or more day-1, day-2, day-3, etc. parameters. In some embodiments, the daily configuration files of the application 720 include host names, IP addresses, CNFD or the like. In some embodiments, the daily configuration files of the application 720 correspond to iterated versions of the initial daily configuration files of the application 720 (e.g., Day-0 files).

In operation S802 of method 800, extensible markup language (XML) files are generated by CMaaS 214. In some embodiments, the XML files are compatible with pushing the configuration files to the application 720 (e.g., operation S806). In some embodiments, CMaaS 214 generates the XML files as part of the Push Access Protocol (PAP). Other protocols are within the scope of the present disclosure.

In operation S803 of method 800, CMaaS 214 establishes a connection with the application 720 that is deployed in the set of target servers 232 or 234. In some embodiments, by successfully establishing the connection with the application 720 that is deployed in the set of target servers 232 or 234, the CMaaS 214 is able to autonomously manage the application 720. In some embodiments, managing the application 720 includes sending the daily configuration files for the application 720 from a centralized system or device (e.g., device 201).

In operation S804 of method 800, a response message 840 is received by orchestrator 210. In some embodiments, the response message 840 indicates that the connection between CMaaS 214 and the application 720 was successfully established. In some embodiments, the response message 840 is sent by CMaaS 214. In some embodiments, when response message 840 indicates that the connection was successful allows the orchestrator 210 to instruct CMaaS to transfer the configuration files to the application 720.

In some embodiments, the response message 840 indicates that the connection between CMaaS 214 and the application 720 was not successfully established or unsuccessful. In these embodiments, operation S803 is repeated one or more times. In some embodiments, after the one or more failed or unsuccessful attempts to establish the connection with the application 720, CMaaS 214 sends one or more response messages 840 to orchestrator 210 that indicate the failed or unsuccessful attempts. In some embodiments, in response to response message 840 indicating failed or unsuccessful attempts to establish the connection with the application 720, orchestrator 210 may instruct the CMaaS 214 to stop trying to establish the connection with the application 720.

In some embodiments, after one or more failed or unsuccessful attempts to establish the connection with the application 720, the connection attempts may timeout and be cancelled by the CMaaS 214, and the orchestrator 210 may instruct the CMaaS 214 to attempt to retry connection to the application 720 as described above.

In some embodiments, the application 720 is deployed on a single target server of the set of target servers 232 or 234, and one response message 840 is sent by CMaaS 214 for the target server of the set of target servers 232 or 234 that has deployed the application 720.

In some embodiments, the application 720 is deployed on a single target server of the set of target servers 232 or 234. In some embodiments, the application 720 is deployed on more than one target server of the set of target servers 232 or 234, and one response message 840 is sent by CMaaS 214 for each of the target servers of the set of target servers 232 or 234 that have deployed the application 720.

In some embodiments, the application 720 is deployed on more than one target server of the set of target servers 232 or 234, and a corresponding response message 840 is sent by CMaaS 214 for each target server of the set of target servers 232 or 234 that has deployed the application 720.

Other message types or numbers of messages for response message 840 are within the scope of the present disclosure.

In some embodiments, at least operation S801, S802, S803 or S804 of method 800 are an embodiment of operation S307 of method 300 of FIG. 3, and similar detailed description is therefore omitted.

In operation S805 of method 800, the orchestrator 210 sends a push notification to the CMaaS 214. In some embodiments, operation S805 includes the orchestrator 210 sending the push notification to the CMaaS 214 in response to the receipt of response message 840, and the response message 840 indicating that the connection between CMaaS 214 and the application 720 was successfully established. In some embodiments, the push notification sent to the CMaaS 214, instructs the CMaaS to push the daily configuration files and the XML files to the application 720.

In operation S806 of method 800, CMaaS 214 pushes the daily configuration files and the XML files to the application 720 in response to the push notification sent from orchestrator 210 in operation S805.

In operation S807 of method 800, a response message 842 is received by orchestrator 210. In some embodiments, the response message 842 indicates that the daily configuration files were successfully pushed to the application 720 thereby causing the orchestrator 210 to change the application state of application 720 from the instantiated state 504 to the configured state 505. In some embodiments, the response message 842 is sent by CMaaS 214.

In some embodiments, operation S807 further includes the orchestrator 210 changing the application state of application 720 to the configured state 505.

In some embodiments, the application 720 is deployed on a single target server of the set of target servers 232 or 234, and one response message 842 is sent by CMaaS 214 that indicates that the daily configuration files and the XML files have been pushed to the application 720 that is deployed by the one target server of the set of target servers 232 or 234.

In some embodiments, the application 720 is deployed on more than one target server of the set of target servers 232 or 234, and one response message 842 is sent by CMaaS 214 that indicates that the daily configuration files and the XML files have been pushed to the application 720 that is deployed by the plurality of target servers of the set of target servers 232 or 234.

In some embodiments, the application 720 is deployed on more than one target server of the set of target servers 232 or 234, and a corresponding response message 842 is sent by CMaaS 214 for each target server of the set of target servers 232 or 234 that has deployed the application 720 that indicates that the corresponding daily configuration files and the XML files have been pushed to the application 720 that is deployed by the plurality of target servers of the set of target servers 232 or 234.

Other message types or numbers of messages for response message 842 are within the scope of the present disclosure.

In some embodiments, at least operation S805, S806 or S807 of method 800 are an embodiment of operation S308 of method 300 of FIG. 3, and similar detailed description is therefore omitted.

In some embodiments, one or more of the operations of method 800 is not performed. By utilizing method 800, one or more elements of system 100 is configured to achieve the benefits discussed above with respect to system 100 and method 300.

FIG. 9 is a flowchart of a method 900, in accordance with some embodiments.

Method 900 is an embodiment of at least operations S309 or S310 of method 300 of FIG. 3, and similar detailed description is therefore omitted. For example, in some embodiments, method 900 is a method of at least the orchestrator 210 triggering the OBF tool 216 to start application monitoring in response to the orchestrator 210 submitting the daily monitoring configurations to the OBF tool 216, and the OBF tool monitoring the application 720 in the set of target servers 232 or 234 in response to being triggered by the orchestrator 210.

In some embodiments, FIG. 9 is a flowchart of a method of operating system 100 of FIG. 1 or device 201 of FIG. 2, and similar detailed description is therefore omitted. It is understood that additional operations may be performed before, during, and/or after the method 900 depicted in FIG. 9, and that some other operations may only be briefly described herein. In some embodiments, other order of operations of method 900 is within the scope of the present disclosure. In some embodiments, one or more operations of method 900 are not performed.

Method 900 includes exemplary operations, but the operations are not necessarily performed in the order shown. Operations may be added, replaced, changed order, and/or eliminated as appropriate, in accordance with the spirit and scope of disclosed embodiments. It is understood that method 900 utilizes features of one or more of system 100, method 300 or application package configuration 400.

In some embodiments, operation method 900 is triggered in response to the application state reaching the configured state 505.

In operation S901 of method 900, the orchestrator 210 performs an API call request to on-board one or more network functions into the OBF tool 216. In some embodiments, operation S901 includes the orchestrator 210 instructing the OBF tool 216 to monitor the application 720 based on the one or more network functions or elements.

In some embodiments, network functions or elements comprise, for example, network resources such as hardware resources associated with, or capable of being used by, a network, or software resources associated with, or capable of being used by, a network, one or more network functions, one or more network services, one or more slice subnets, one or more network slices, one or more network function-service-slice packages, one or more network function-service-slice packages and related artifacts, a slice manager, one or more servers (e.g., set of target servers 232 or 234, or edge devices 106 in FIG. 1 or some other suitable computer), one or more platform units, CMaaS manager (e.g., CMaaS 214 in FIG. 2 or some other suitable CMaaS device), a BMaaS manager, an inventory manager, a monitoring manager, an OBF tool 216 or some other suitable OBF tool), a service catalog storage/manager, a Kubernetes service cluster, other suitable cluster, a policy life cycle manager, a hardware switch, a field programmable gate array, a vRAN, a GC, an NFP, or other suitable network element and/or network resource. Other types of network functions are within the scope of the present disclosure.

In operation S902 of method 900, the OBF tool 216 generates at least one or more target application matrices and log-in configuration files. In some embodiments, the at least one or more target application matrices and log-in configuration files correspond to YAML configuration files utilized by the OBF tool 216 for configuration so that the OBF tool 216 is able to observe or monitor the application 720.

In some embodiments, the one or more target application matrices and log-in configuration files correspond to the OBF files 408*d* shown in FIG. 4. In some embodiments, the one or more target application matrices correspond to the Matrices.yaml files shown in FIG. 4. In some embodiments, the one or more log-in configuration files correspond to the Logging.yaml files shown in FIG. 4.

Other types of files are generated or received by the OBF tool 216 and are within the scope of the present disclosure.

In operation S903 of method 900, the OBF tool 216 configures the application 720 to start sending at least one or more events or logs to the OBF tool 216.

In some embodiments, events or logs include one or more status updates of the application 720, or one or more workflows associated with on-boarding of the application 720. In some embodiments, the one or more workflows corresponds to a type of network element and comprises one or more of an operating system installation, an upgrade, a firmware upgrade, a change in BIOS settings, or some other suitable operation or event.

In some embodiments, at least operation S901, S902 or S903 of method 900 are an embodiment of operation S309 of method 300 of FIG. 3, and similar detailed description is therefore omitted.

In operation S904 of method 900, the OBF tool 216 receives the requested events or logs from the application 720. In some embodiments, the requested events or logs of operation S904 are sent by the set of target servers 232 or 234 that application 720 is deployed on.

In some embodiments, the application 720 is deployed on a single target server of the set of target servers 232 or 234, and the requested events or logs of operation S904 are sent by the single target server of the set of target servers 232 or 234 that application 720 is deployed on.

In some embodiments, the application 720 is deployed on more than one target server of the set of target servers 232 or 234, and the requested events or logs of operation S904 are sent by each target server of the set of target servers 232 or 234 that has deployed the application 720.

In operation S905 of method 900, the orchestrator 210 receives a response message 940. In some embodiments, the response message 940 indicates that the application 720 has started sending events to the OBF tool 216, thereby causing the orchestrator 210 to change the application state of application 720 from the configured state 505 to the monitored state 506.

In some embodiments, the response message 940 is a confirmation that the OBF tool 216 has started receiving events from the application 720. In some embodiments, the response message 940 is sent by OBF tool 216.

In some embodiments, operation S905 further includes the orchestrator 210 changing the application state of application 720 to the monitored state 506.

In operation S906 of method 900, a message is displayed by the orchestrator 210 to user 204 indicating that the application 720 was on-boarded successfully.

In some embodiments, at least operation S903, S904, S905 or S906 of method 900 are an embodiment of operation S310 of method 300 of FIG. 3, and similar detailed description is therefore omitted.

In some embodiments, one or more of the operations of method 900 is not performed. By utilizing method 900, one or more elements of system 100 is configured to achieve the benefits discussed above with respect to system 100 and method 300.

Figure 10:
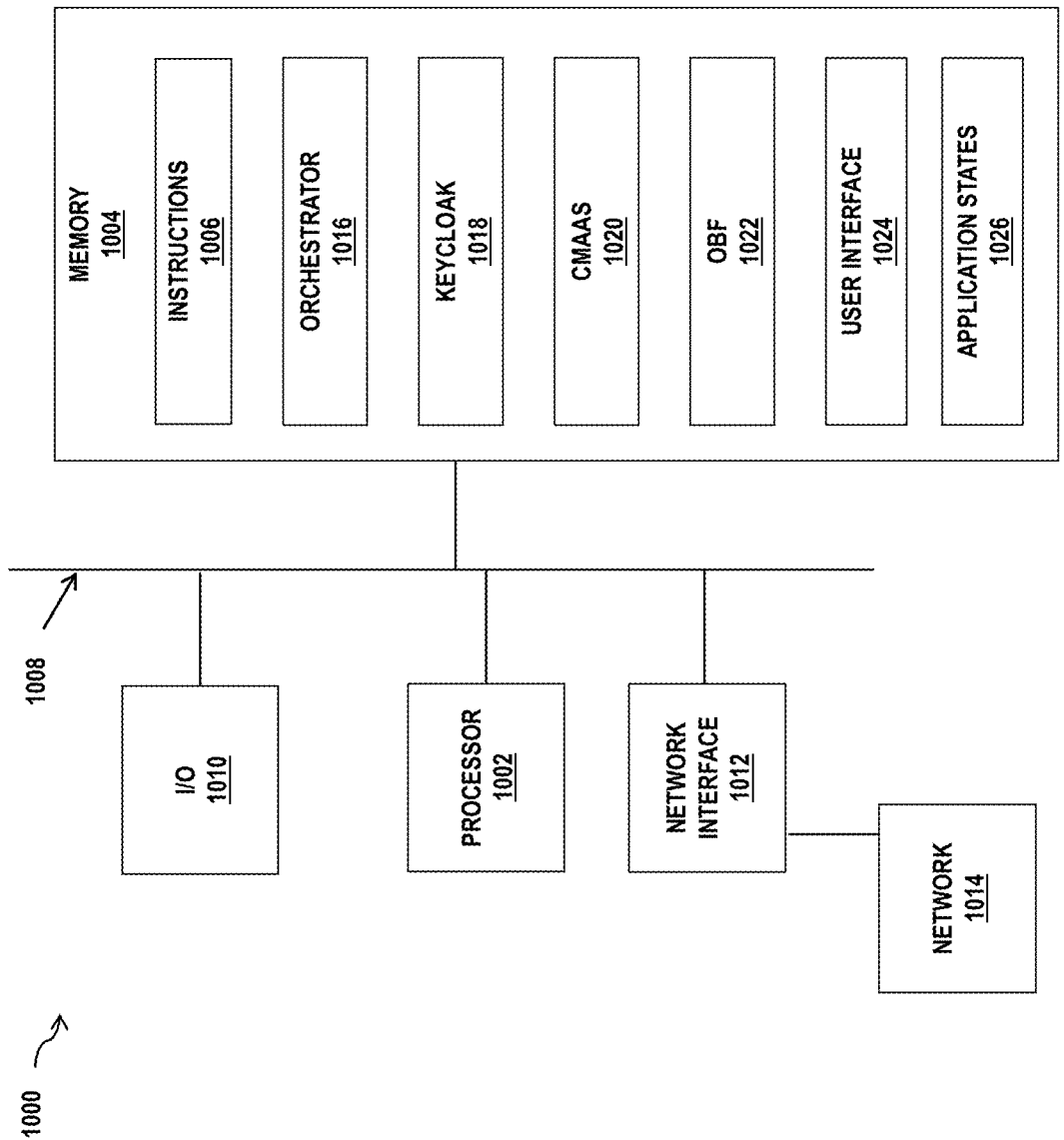
FIG. 10 is a schematic view of a system, in accordance with some embodiments.

FIG. 10 is a schematic view of a system 1000, in accordance with some embodiments.

In some embodiments, system 1000 is an embodiment of system 201 of FIG. 2, and similar detailed description is therefore omitted.

In some embodiments, system 1000 is an embodiment of one or more elements in system 201, and similar detailed description is therefore omitted. For example, in some embodiments, system 1000 is an embodiment of one or more of orchestrator 210, keycloak 212, CMaaS 214 or OBF tool 216, and similar detailed description is therefore omitted.

In some embodiments, system 1000 is an embodiment of one or more devices 102 in FIG. 1, and similar detailed description is therefore omitted.

In some embodiments, system 1000 is an embodiment of one or more edge devices 106 in FIG. 1 or one or more target servers of the set of target servers 232 or 234, and similar detailed description is therefore omitted.

In some embodiments, system 1000 is configured to perform one or more operations of method 300, method 700, method 800 or method 900.

System 1000 includes a hardware processor 1002 and a non-transitory, computer readable storage medium 1004 (e.g., memory 1004) encoded with, i.e., storing, the computer program code 806, i.e., a set of executable instructions 806. Computer readable storage medium 1004 is configured for interfacing with at least devices 102 in FIG. 1, edge devices 106 in FIG. 1, system 201, orchestrator 210, keycloak 212, CMaaS 214, OBF tool 216, or one or more target servers of the set of target servers 232 or 234.

The processor 1002 is electrically coupled to the computer readable storage medium 1004 by a bus 1008. The processor 1002 is also electrically coupled to an I/O interface 1010 by bus 1008. A network interface 1012 is also electrically connected to the processor 1002 by bus 1008. Network interface 1012 is connected to a network 814, so that processor 1002 and computer readable storage medium 1004 are capable of connecting to external elements by network 814. The processor 1002 is configured to execute the computer program code 806 encoded in the computer readable storage medium 1004 in order to cause system 1000 to be usable for performing a portion or all of the operations as described in at least method 300, method 700, method 800 or method 900. In some embodiments, network 814 is not part of system 1000. In some embodiments, network 814 is an embodiment of network 104 or 108 of FIG. 1.

In some embodiments, the processor 1002 is a central processing unit (CPU), a multi-processor, a distributed processing read circuit, an application specific integrated circuit (ASIC), and/or a suitable processing unit.

In some embodiments, the computer readable storage medium 1004 is an electronic, magnetic, optical, electromagnetic, infrared, and/or a semiconductor read circuit (or apparatus or device). For example, the computer readable storage medium 1004 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 1004 includes a compact disk-read only memory (CD-ROM), a compact disk-read/write (CD-R/W), and/or a digital video disc (DVD).

In some embodiments, forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

In some embodiments, the storage medium 1004 stores the computer program code 806 configured to cause system 1000 to perform one or more operations of at least method 300, method 700, method 800 or method 900. In some embodiments, the storage medium 1004 also stores information used for performing at least method 300, method 700, method 800 or method 900 as well as information generated during performing at least method 300, method 700, method 800 or method 900, such as orchestrator 1016, Keycloak 1018, CMaaS 1020, OBF 1022, user interface 1024, application states 1026, and/or a set of executable instructions to perform one or more operations of at least method 300, method 700, method 800 or method 900.

In some embodiments, the storage medium 1004 stores instructions (e.g., computer program code 806) for interfacing with at least devices 102 in FIG. 1, edge devices 106 in FIG. 1, system 201, orchestrator 210, keycloak 212, CMaaS 214, OBF tool 216, or one or more target servers of the set of target servers 232 or 234. The instructions (e.g., computer program code 806) enable processor 1002 to generate instructions readable by at least devices 102 in FIG. 1, edge devices 106 in FIG. 1, system 201, orchestrator 210, keycloak 212, CMaaS 214, OBF tool 216, or one or more target servers of the set of target servers 232 or 234 to effectively implement one or more operations of at least method 300, method 700, method 800 or method 900 during operation of system 201.

System 1000 includes I/O interface 1010. I/O interface 1010 is coupled to external circuitry. In some embodiments, I/O interface 1010 includes a keyboard, keypad, mouse, trackball, trackpad, and/or cursor direction keys for communicating information and commands to processor 1002.

System 1000 also includes network interface 1012 coupled to the processor 1002. Network interface 1012 allows system 1000 to communicate with network 814, to which one or more other computer read circuits are connected. Network interface 1012 includes wireless network interfaces such as BLUETOOTH, WIFI, WIMAX, GPRS, or WCDMA; or wired network interface such as ETHERNET, USB, or IEEE-884. In some embodiments, at least method 300, method 700, method 800 or method 900 is implemented in two or more systems 1000, and information such as orchestrator, Keycloak, CMaaS, OBF and user interface are exchanged between different systems 1000 by network 814.

System 1000 is configured to receive information related to an orchestrator through I/O interface 1010 or network interface 1012. The information is transferred to processor 1002 by bus 1008, and is then stored in computer readable medium 1004 as orchestrator 1016. In some embodiments, orchestrator 1016 corresponds to orchestrator 210, and similar detailed description is therefore omitted. System 1000 is configured to receive information related to Keycloak through I/O interface 1010 or network interface 1012. The information is stored in computer readable medium 1004 as Keycloak 1018. In some embodiments, Keycloak 1018 corresponds to Keycloak 212, and similar detailed description is therefore omitted. System 1000 is configured to receive information related to a CMaaS through I/O interface 1010 or network interface 1012. The information is stored in computer readable medium 1004 as CMaaS 1020. In some embodiments, CMaaS 1020 corresponds to CMaaS 214, and similar detailed description is therefore omitted. System 1000 is configured to receive information related to an OBF through I/O interface 1010 or network interface 1012. The information is stored in computer readable medium 1004 as OBF 1022. In some embodiments, OBF 1022 corresponds to OBF 216, and similar detailed description is therefore omitted. System 1000 is configured to receive information related to a user interface through I/O interface 1010 or network interface 1012. The information is stored in computer readable medium 1004 as user interface 1024. System 1000 is configured to receive information related to application states through I/O interface 1010 or network interface 1012. The information is stored in computer readable medium 1004 as application states 1026.

In some embodiments, at least method 300, method 700, method 800 or method 900 is implemented as a standalone software application for execution by a processor. In some embodiments, at least method 300, method 700, method 800 or method 900 is implemented as corresponding software applications for execution by one or more processors.

In some embodiments, at least method 300, method 700, method 800 or method 900 is implemented as a software application that is a part of an additional software application. In some embodiments, at least method 300, method 700, method 800 or method 900 is implemented as a plug-in to a software application.

In some embodiments, at least method 300, method 700, method 800 or method 900 is implemented as a software application that is a portion of an orchestrator tool. In some embodiments, at least method 300, method 700, method 800 or method 900 is implemented as a software application that is used by an orchestrator tool. In some embodiments, the orchestrator tool is used to orchestrator deployment of one or more software applications to a set of target servers.

In some embodiments, one or more of the operations of method 300, 400, 700, 800 or 900 is not performed.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

One aspect of this description relates to a method. In some embodiments, the method includes creating, by a first processor, a first package of an application, the first package including at least deployment files of the application, Keycloak information for the application, daily management configurations of the application for a configuration management tool, or daily monitoring configurations for monitoring the application in an observability framework (OBF) tool. In some embodiments, the method further includes registering the first package with an orchestrator, triggering, by a user, instantiation of the application in the orchestrator, generating, by the orchestrator, initial configuration files for the instantiation of the application, and changing an application state of the application to a planned state, changing the application state to a Keycloak state in response to obtaining client identification of the Keycloak information for the application, changing the application state to an instantiated state in response to deploying the application on the set of target servers, changing the application state to a configured state in response to submitting daily configuration files to the configuration management tool for daily configuration, and applying, by the configuration management tool, the daily configuration files to perform daily configuration of the application in the set of target servers, and changing the application state to a monitored state in response to triggering the OBF tool to start application monitoring in response to the orchestrator submitting the daily monitoring configurations to the OBF tool, and monitoring, by the OBF tool, the application in the set of target servers.

Another aspect of this description relates to an apparatus. In some embodiments, the system includes a memory having non-transitory instructions stored, and a processor coupled to the memory, and being configured to execute the instructions, thereby causing the apparatus to: create a first package of an application, the first package including at least deployment files of the application, Keycloak information for the application, daily management configurations of the application for a configuration management tool, or daily monitoring configurations for monitoring the application in an observability framework (OBF) tool, register the first package with an orchestrator, trigger instantiation of the application in the orchestrator, generate, by the orchestrator, initial configuration files for the instantiation of the application, and change an application state of the application to a planned state, change the application state to a Keycloak state in response to obtaining client identification of the Keycloak information for the application, change the application state to an instantiated state in response to deployment of the application on the set of target servers, change the application state to a configured state in response to submitting daily configuration files to the configuration management tool for daily configuration, and applying, by the configuration management tool, the daily configuration files to perform daily configuration of the application in the set of target servers, and change the application state to a monitored state in response to triggering the OBF tool to start application monitoring in response to the orchestrator submitting the daily monitoring configurations to the OBF tool, and monitoring, by the OBF tool, the application in the set of target servers.

Still another aspect of this description relates to a computer-readable medium. In some embodiments, the computer-readable medium includes instructions executable by a controller of a user equipment to cause the controller to perform operations including creating a first package of an application, the first package including at least deployment files of the application, Keycloak information for the application, daily management configurations of the application for a configuration management tool, or daily monitoring configurations for monitoring the application in an observability framework (OBF) tool, registering the first package with an orchestrator, triggering, by a user, instantiation of the application in the orchestrator, generating, by the orchestrator, initial configuration files for the instantiation of the application, and changing an application state of the application to a planned state, changing the application state to a Keycloak state in response to obtaining client identification of the Keycloak information for the application, changing the application state to an instantiated state in response to deploying the application on the set of target servers, changing the application state to a configured state in response to submitting daily configuration files to the configuration management tool for daily configuration, and applying, by the configuration management tool, the daily configuration files to perform daily configuration of the application in the set of target servers, and changing the application state to a monitored state in response to triggering the OBF tool to start application monitoring in response to the orchestrator submitting the daily monitoring configurations to the OBF tool, and monitoring, by the OBF tool, the application in the set of target servers.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising: creating, by a first processor, a first package of an application, the first package including at least deployment files of the application, Keycloak information for the application, daily management configurations of the application for a configuration management tool, and daily monitoring configurations for monitoring the application in an observability framework (OBF) tool; registering the first package with an orchestrator; triggering, by a user, instantiation of the application in the orchestrator; generating, by the orchestrator, initial configuration files for the instantiation of the application, and changing an application state of the application to a planned state; changing the application state to a Keycloak state in response to obtaining client identification of the Keycloak information for the application; changing the application state to an instantiated state in response to deploying the application on the set of target servers; changing the application state to a configured state in response to submitting daily configuration files to the configuration management tool for daily configuration, and applying, by the configuration management tool, the daily configuration files to perform daily configuration of the application in the set of target servers; and changing the application state to a monitored state in response to triggering the OBF tool to start application monitoring in response to the orchestrator submitting the daily monitoring configurations to the OBF tool, and monitoring, by the OBF tool, the application in the set of target servers.

2. The method of claim 1, wherein triggering instantiation of the application comprises:
   selecting, by the user, the set of target servers for deployment of the application on the set of target servers, and creating, by the orchestrator, an application instance object of the application in an application inventory thereby setting the application state of the application as a draft state.

3. The method of claim 1, wherein registering the first package with the orchestrator comprises:
   reviewing, by an administrator, the first package; and
   approving the first package.

4. The method of claim 1, wherein changing the application state to the Keycloak state comprises:
   extracting, by the orchestrator, client identity access management (IAM) data from the first package, the client IAM data including at least a client type, a login page, a client name, a client description, an authorization protocol, redirect uniform resource locators (URLs) or a base URL;
   creating a client for Keycloak, by an application programming interface (API) call, wherein the API call includes metadata of the client IAM data; and
   receiving, by the orchestrator, a first response message, the first response message indicating the client identification.

5. The method of claim 4, wherein changing the application state to the Keycloak state further comprises:

storing, by the Keycloak, a client secret in a vault of the Keycloak;
creating permissions and user roles for each corresponding user of the application in the Keycloak; and
receiving, by the orchestrator, a second response message, the second response message indicating that the permissions and user roles for each corresponding user of the application in the Keycloak was successfully created in the Keycloak.

6. The method of claim 5, wherein changing the application state to the instantiated state comprises:
adding the Keycloak information in the initial configuration files for instantiation of the application, and deploying the application on the set of target servers; and
receiving, by the orchestrator, a third response message, the third response message indicating that the application was successfully deployed in the set of target servers.

7. The method of claim 1, wherein changing the application state to the configured state comprises:
sharing, by the orchestrator, the daily configuration files with the configuration management tool;
generating, by the configuration management tool, extensible markup language (XML) files that are compatible with pushing files to the application;
establishing, by the configuration management tool, a connection with the application;
receiving, by the orchestrator, a first response message, the first response message indicating that the connection between the configuration management tool and the application was successfully established;
sending, by the orchestrator, a push notification to the configuration management tool;
pushing, by the configuration management tool, the daily configuration files and the XML files to the application in response to the push notification; and
receiving, by the orchestrator, a second response message, the second response message indicating that the daily configuration files were successfully pushed to the application.

8. The method of claim 1, wherein
changing the application state to a monitored state comprises:
performing, by the orchestrator, an application programming interface (API) call request to on-board a network function into the OBF tool;
generating, by the OBF tool, target application matrices and log-in configuration files;
configuring, by the OBF tool, the application to start sending at least events or logs to the OBF tool;
receiving, by the OBF, the events from the application; and
receiving, by the orchestrator, a first response message, the first response message indicating that the application has started sending events to the OBF; and
wherein the method further comprises:
generating a first message to the user that the application was on-boarded successfully.

9. An apparatus, comprising: a memory having non-transitory instructions stored; and a processor coupled to the memory, and being configured to execute the instructions, thereby causing the apparatus to: create a first package of an application, the first package including at least deployment files of the application, Keycloak information for the application, daily management configurations of the application for a configuration management tool, and daily monitoring configurations for monitoring the application in an observability framework (OBF) tool; register the first package with an orchestrator; trigger instantiation of the application in the orchestrator; generate, by the orchestrator, initial configuration files for the instantiation of the application, and change an application state of the application to a planned state; change the application state to a Keycloak state in response to obtaining client identification of the Keycloak information for the application; change the application state to an instantiated state in response to deployment of the application on the set of target servers; change the application state to a configured state in response to submitting daily configuration files to the configuration management tool for daily configuration, and applying, by the configuration management tool, the daily configuration files to perform daily configuration of the application in the set of target servers; and change the application state to a monitored state in response to triggering the OBF tool to start application monitoring in response to the orchestrator submitting the daily monitoring configurations to the OBF tool, and monitoring, by the OBF tool, the application in the set of target servers.

10. The apparatus of claim 9, wherein
the instructions that cause the apparatus to trigger instantiation of the application comprises, the processor is further configured to cause the apparatus to:
select the set of target servers for deployment of the application on the set of target servers, and create, by the orchestrator, an application instance object of the application in an application inventory to thereby set the application state of the application as a draft state; and
the instructions that cause the apparatus to register the first package with the orchestrator comprises, the processor is further configured to cause the apparatus to:
review, by an administrator, the first package; and
approve the first package.

11. The apparatus of claim 9, wherein the instructions that cause the apparatus to change the application state to the Keycloak state, the processor is further configured to cause the apparatus to:
extract, by the orchestrator, client identity access management (IAM) data from the first package, the client IAM data including at least a client type, a login page, a client name, a client description, an authorization protocol, redirect uniform resource locators (URLs) or a base URL;
create a client for Keycloak, by an application programming interface (API) call, wherein the API call includes metadata of the client IAM data; and
receive, by the orchestrator, a first response message, the first response message indicating the client identification.

12. The apparatus of claim 11, wherein the instructions that cause the apparatus to change the application state to the Keycloak state, the processor is further configured to further cause the apparatus to:
store, by the Keycloak, a client secret in a vault of the Keycloak;
create permissions and user roles for each corresponding user of the application in the Keycloak; and
receive, by the orchestrator, a second response message, the second response message indicating that the permissions and the user roles for each corresponding user of the application in the Keycloak was successfully created in the Keycloak.

13. The apparatus of claim 12, wherein the instructions that cause the apparatus to change the application state to the instantiated state, the processor is further configured to cause the apparatus to:
- add the Keycloak information in the initial configuration files for instantiation of the application, and deployment of the application on the set of target servers; and
- receive, by the orchestrator, a third response message, the third response message indicating that the application was successfully deployed in the set of target servers.

14. The apparatus of claim 9, wherein the instructions that cause the apparatus to change the application state to the configured state, the processor is further configured to cause the apparatus to:
- share, by the orchestrator, the daily configuration files with the configuration management tool;
- generate, by the configuration management tool, extensible markup language (XML) files that are compatible with pushing files to the application;
- establish, by the configuration management tool, a connection with the application;
- receive, by the orchestrator, a first response message, the first response message indicating that the connection between the configuration management tool and the application was successfully established;
- send, by the orchestrator, a push notification to the configuration management tool;
- push, by the configuration management tool, the daily configuration files and the XML files to the application in response to the push notification; and
- receive, by the orchestrator, a second response message, the second response message indicating that the daily configuration files were successfully pushed to the application.

15. The apparatus of claim 9, wherein the instructions that cause the apparatus to change the application state to the monitored state, the processor is further configured to cause the apparatus to:
- perform, by the orchestrator, an application programming interface (API) call request to on-board a network function into the OBF tool;
- generate, by the OBF tool, target application matrices and log-in configuration files;
- configure, by the OBF tool, the application to start sending at least events or logs to the OBF tool;
- receive, by the OBF, the events from the application; and
- receive, by the orchestrator, a first response message, the first response message indicating that the application has started sending events to the OBF; and
- wherein the processor is further configured to cause the apparatus to:
  - generate a first message to a user that the application was on-boarded successfully.

16. A computer-readable medium including instructions executable by a controller of a user equipment to cause the controller to perform operations comprising: creating a first package of an application, the first package including at least deployment files of the application, Keycloak information for the application, daily management configurations of the application for a configuration management tool, and daily monitoring configurations for monitoring the application in an observability framework (OBF) tool; registering the first package with an orchestrator; triggering, by a user, instantiation of the application in the orchestrator; generating, by the orchestrator, initial configuration files for the instantiation of the application, and changing an application state of the application to a planned state; changing the application state to a Keycloak state in response to obtaining client identification of the Keycloak information for the application; changing the application state to an instantiated state in response to deploying the application on the set of target servers; changing the application state to a configured state in response to submitting daily configuration files to the configuration management tool for daily configuration, and applying, by the configuration management tool, the daily configuration files to perform daily configuration of the application in the set of target servers; and changing the application state to a monitored state in response to triggering the OBF tool to start application monitoring in response to the orchestrator submitting the daily monitoring configurations to the OBF tool, and monitoring, by the OBF tool, the application in the set of target servers.

17. The computer-readable medium of claim 16, wherein changing the application state to the Keycloak state comprises:
- extracting, by the orchestrator, client identity access management (IAM) data from the first package, the client IAM data including at least a client type, a login page, a client name, a client description, an authorization protocol, redirect uniform resource locators (URLs) or a base URL;
- creating a client for Keycloak, by an application programming interface (API) call, wherein the API call includes metadata of the client IAM data;
- receiving, by the orchestrator, a first response message, the first response message indicating the client identification;
- storing, by the Keycloak, a client secret in a vault of the Keycloak;
- creating permissions and user roles for each corresponding user of the application in the Keycloak; and
- receiving, by the orchestrator, a second response message, the second response message indicating that the permissions and user roles for each corresponding user of the application in the Keycloak was successfully created in the Keycloak.

18. The computer-readable medium of claim 17, wherein triggering instantiation of the application comprises:
- selecting the set of target servers for deployment of the application on the set of target servers, and creating, by the orchestrator, an application instance object of the application in an application inventory thereby setting the application state of the application as a draft state; and
- changing the application state to the instantiated state comprises:
  - adding the Keycloak information in the initial configuration files for instantiation of the application, and deploying the application on the set of target servers; and
  - receiving, by the orchestrator, a third response message, the third response message indicating that the application was successfully deployed in the set of target servers.

19. The computer-readable medium of claim 16, wherein changing the application state to the configured state comprises:
- sharing, by the orchestrator, the daily configuration files with the configuration management tool;
- generating, by the configuration management tool, extensible markup language (XML) files that are compatible with pushing files to the application;
- establishing, by the configuration management tool, a connection with the application;

receiving, by the orchestrator, a first response message, the first response message indicating that the connection between the configuration management tool and the application was successfully established;

sending, by the orchestrator, a push notification to the configuration management tool;

pushing, by the configuration management tool, the daily configuration files and the XML files to the application in response to the push notification; and receiving, by the orchestrator, a second response message, the second response message indicating that the daily configuration files were successfully pushed to the application.

20. The computer-readable medium of claim 16, wherein changing the application state to the monitored state comprises:

performing, by the orchestrator, an application programming interface (API) call request to on-board a network function into the OBF tool;

generating, by the OBF tool, target application matrices and log-in configuration files;

configuring, by the OBF tool, the application to start sending at least events or logs to the OBF tool;

receiving, by the OBF, the events from the application; and receiving, by the orchestrator, a first response message, the first response message indicating that the application has started sending events to the OBF; and wherein the operations further comprises:

generating a first message to the user that the application was on-boarded successfully.

* * * * *